United States Patent
Kodeki et al.

(10) Patent No.: US 9,726,571 B2
(45) Date of Patent: Aug. 8, 2017

(54) POINTING AXIS ESTIMATION DEVICE

(71) Applicant: MITSUBISHI ELECTRIC CORPORATION, Chiyoda-ku (JP)

(72) Inventors: Kazuhide Kodeki, Chiyoda-ku (JP); Seiichi Shimizu, Chiyoda-ku (JP); Osamu Takahara, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 62 days.

(21) Appl. No.: 14/440,669

(22) PCT Filed: Jun. 3, 2013

(86) PCT No.: PCT/JP2013/065390
§ 371 (c)(1),
(2) Date: May 5, 2015

(87) PCT Pub. No.: WO2014/076991
PCT Pub. Date: May 22, 2014

(65) Prior Publication Data
US 2015/0292977 A1 Oct. 15, 2015

(30) Foreign Application Priority Data

Nov. 13, 2012 (JP) ................................. 2012-249474

(51) Int. Cl.
*G01B 9/00* (2006.01)
*G01M 11/02* (2006.01)
(Continued)

(52) U.S. Cl.
CPC ........... *G01M 11/0221* (2013.01); *B64G 1/66* (2013.01); *G01B 11/272* (2013.01); *B64G 2001/228* (2013.01); *G02B 23/02* (2013.01)

(58) Field of Classification Search
CPC ............... B64G 1/66; B64G 2001/228; G01M 11/0221; G02B 23/02
(Continued)

(56) References Cited

U.S. PATENT DOCUMENTS

2002/0145102 A1 10/2002 Eckelkamp-Baker et al.
2002/0158186 A1 10/2002 Eckelkamp-Baker et al.
(Continued)

FOREIGN PATENT DOCUMENTS

JP 4 20914 1/1992
JP 4 304785 10/1992
(Continued)

OTHER PUBLICATIONS

Extended European Search Report issued Jun. 9, 2016 in Patent Application No. 13855966.1.
(Continued)

*Primary Examiner* — Sunghee Y Gray
(74) *Attorney, Agent, or Firm* — Oblon, McClelland, Maier & Neustadt, L.L.P.

(57) ABSTRACT

A pointing axis estimation apparatus capable of removing pointing axis variations caused by factors other than pointing axis variations of a telescope, thereby estimating true pointing axis variations of the telescope. The pointing axis estimation apparatus includes: a laser light source-unit attitude detector for calculating translational and rotational displacements of a laser light source unit; an optical axis detection-unit attitude detector for calculating translational and rotational displacements of an optical axis detection unit; a pointing axis calculator for calculating a pointing axis based on information from an optical axis variation detector; and a pointing axis variation estimator for calculating a true pointing axis variation of a telescope based on displacement data output from the detectors and the calculator.

17 Claims, 18 Drawing Sheets

(51) Int. Cl.
    *B64G 1/66*     (2006.01)
    *G01B 11/27*     (2006.01)
    *G02B 23/02*     (2006.01)
    *B64G 1/22*     (2006.01)

(58) Field of Classification Search
    USPC .......................................................... 356/127
    See application file for complete search history.

(56) References Cited

U.S. PATENT DOCUMENTS

| | | | |
|---|---|---|---|
| 2011/0037970 A1* | 2/2011 | Rogers | G01P 5/26 |
| | | | 356/28 |
| 2011/0049328 A1 | 3/2011 | Vaillon et al. | |
| 2013/0103344 A1* | 4/2013 | Bye | G01C 21/16 |
| | | | 702/150 |

FOREIGN PATENT DOCUMENTS

| | | |
|---|---|---|
| JP | 6 50767 | 2/1994 |
| JP | 11 326780 | 11/1999 |
| JP | 2004 145422 | 5/2004 |

OTHER PUBLICATIONS

International Search Report Issued Aug. 13, 2013 in PCT/JP13/065390 Filed Jun. 3, 2013.

\* cited by examiner

POINTING AXIS ESTIMATION DEVICE

TECHNICAL FIELD

The present invention relates to a pointing axis estimation apparatus including a pointing axis variation estimator configured to remove pointing axis variations caused by factors other than telescope pointing axis variations, thereby calculating true pointing axis variations of a telescope.

BACKGROUND ART

A related-art pointing axis estimation apparatus can detect alignment variations caused by an optical axis of an optical system and an installation of a detection unit in an optical sensor by means of a plurality of laser light beams and light receiving elements for receiving the laser light beams, and can transmit the variations to a ground station, thereby correcting an image distortion caused by changes in an observation viewing direction (pointing direction) and optical performance, which are caused by random and short-term alignment variations in the optical sensor (for example, refer to Patent Literature 1).

CITATION LIST

Patent Literature

[PTL 1] JP 6-50767 A (p. 3, FIG. 1)

SUMMARY OF INVENTION

Technical Problem

An optical axis variation of a laser light source unit serving as a reference of the viewing direction cannot be detected in this pointing axis estimation apparatus. Moreover, an optical axis variation caused by an attitude change of a light receiving element unit that receives the laser light cannot be detected. As a result, there is such a problem in that a pointing axis variation actually generated in the telescope cannot be estimated.

The present invention has been made to solve the above-mentioned problem, and has an object to acquire a pointing axis estimation apparatus capable of removing pointing axis variations caused by factors other than the pointing axis variations of a telescope, thereby estimating the true pointing axis variations of the telescope.

Solution to Problem

According to one embodiment of the present invention, there is provided a pointing axis estimation apparatus, including: a laser light source-unit attitude detector for calculating translational and rotational displacements of a laser light source unit; an optical axis detection-unit attitude detector for calculating translational and rotational displacements of an optical axis detection unit; a pointing axis calculator for calculating a pointing axis based on information from an optical axis variation detector; and a pointing axis variation estimator for calculating a true pointing axis variation of a telescope based on displacement data output from the detectors and the calculator.

Advantageous Effects of Invention

According to the one embodiment of the present invention, remarkable effects that cannot be achieved in the related art may be achieved, such as enabling removing of the pointing axis variations caused by factors other than the pointing axis variations of a telescope, thereby estimating the true pointing axis variations of the telescope.

DESCRIPTION OF EMBODIMENTS

First Embodiment

Figure 1:
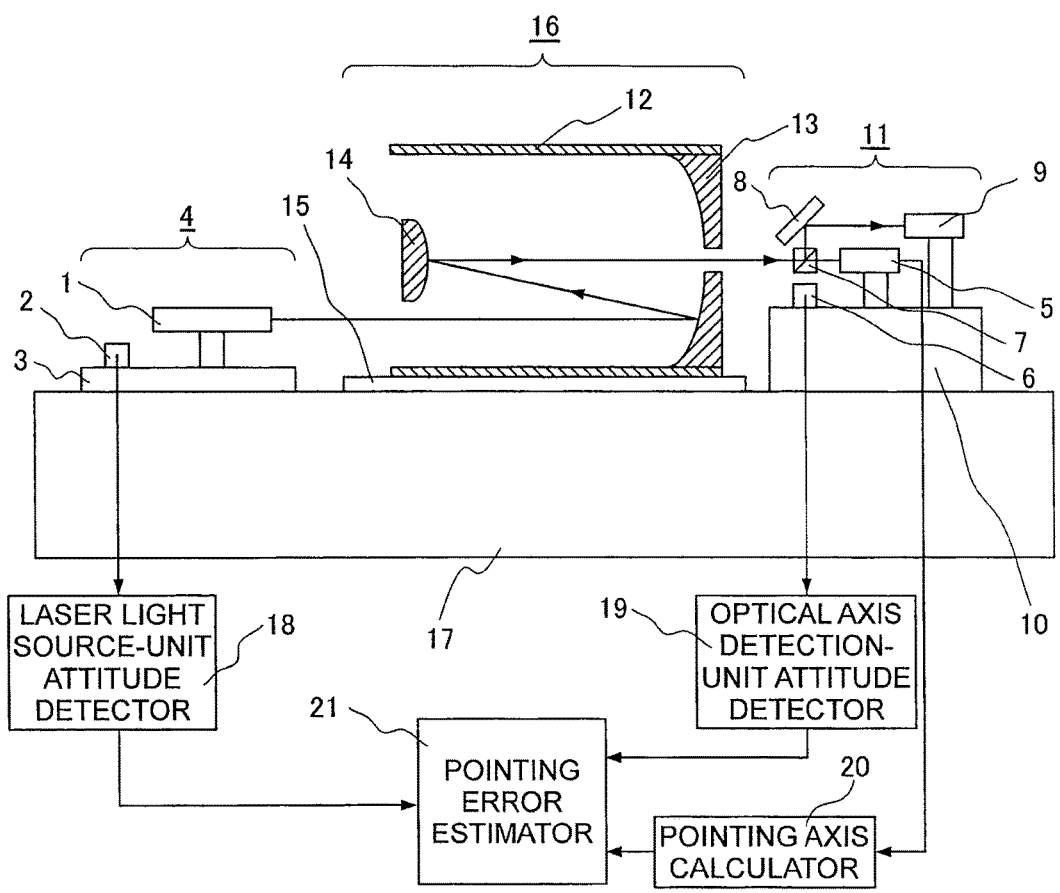
FIG. 1 is a side view illustrating a pointing axis estimation apparatus according to a first embodiment of the present invention.

FIG. 1 is a side view illustrating a pointing axis estimation apparatus according to a first embodiment of the present invention. A laser light source unit 4, an optical axis detection unit 11, and a telescope unit 16 are mounted on a telescope mounting structure 17. In the telescope unit 16, a body tube 12, a primary mirror 13, and a secondary mirror 14 are installed on a telescope installation part 15, and the body tube 12 is fixed to the telescope installation part 15. A laser light source 1 and first inertial sensors 2 are installed on a laser light source installation part 3 in the laser light source unit 4. The laser light source 1 is fixed to the laser light source installation part 3 sufficient in the rigidity.

Figure 2:
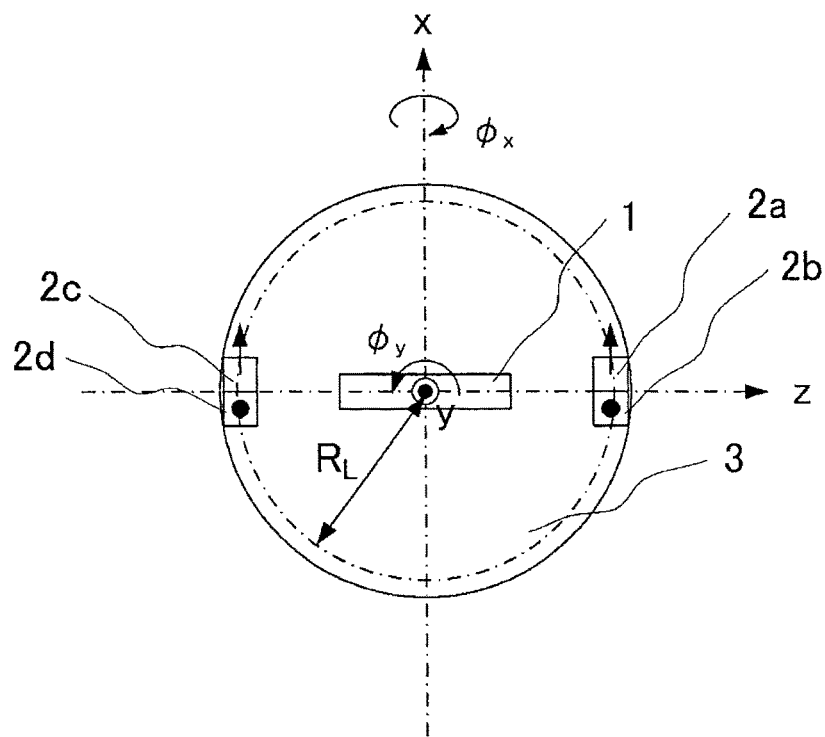
FIG. 2 is a plan view illustrating a laser light source unit of the pointing axis estimation apparatus according to the first embodiment of the present invention.

FIG. 2, which is a plan view of the laser light source unit 4, illustrates an example of an arrangement method for the first inertial sensors 2. A traveling direction of the laser light is defined as +z axis, a direction coming out perpendicularly from the drawing sheet is defined as +y axis, and an axis acquired by rotating the +z axis by 90 degrees in the counterclockwise direction about the y axis is defined as +x axis. First inertial sensors 2a and 2c for detecting a translational displacement in the x axis direction and a rotational displacement about the y axis of the laser light source installation part 3 are arranged so as to detect the displacements in the x axis direction, and first inertial sensors 2b and 2d for detecting a translational displacement in the y axis direction and a rotational displacement about the x axis of the laser light source installation part 3 are arranged so as to detect the displacements in the y axis direction. Moreover, the first inertial sensors 2a to 2d are arranged on a circle having a radius $R_L$.

A description is now given of a method of detecting the translational displacement in the x axis direction, $\delta_{x,LS}$, the rotational displacement about the x axis, $\phi_{x,LS}$, the translational displacement in the y axis direction, $\delta_{y,LS}$, and the rotational displacement about the y axis, $\phi_{y,LS}$ of the laser light source installation part 3 by using the first inertial sensors 2 illustrated in FIG. 2. When an output of the first inertial sensor 2c is L1, an output of the first inertial sensor 2d is L2, an output of the first inertial sensor 2a is L3, and an output of the first inertial sensor 2b is L4, a relationship between the translational displacements and the angular displacements of the laser light source installation part 3 and the outputs of the first inertial sensors 2a to 2d is represented by Expression (1-1). The translational displacements and the angular displacements of the laser light source installation part 3 are acquired from the outputs of the first inertial sensors 2a to 2d by transforming Expression (1-1) as represented by Expression (1-2). On this occasion, when the first inertial sensors 2a to 2d output speeds or accelerations, the values acquired by using Expression (1-2) can be converted into the translational displacements and the angular displacements by means of first-order or second-order integration. Further, when a pointing error optical conversion coefficient for the translational displacements of the laser light source installation part 3 is $T_{LS}$, and a pointing error optical conversion coefficient for the angular displacements of the laser light source installation part 3 is $R_{LS}$, pointing variations caused by the translational displacements and the angular displacements of the laser light source installation part 3 are represented by Expression (1-3). On this occasion, $T_{LS}$ and $R_{LS}$ are calculated by means of optical sensitivity analysis. It should be noted that the calculations by using Expressions (1-1), (1-2), and (1-3) are carried out by a laser light source-unit attitude detector 18.

$$\begin{bmatrix} L_1 \\ L_2 \\ L_3 \\ L_4 \end{bmatrix} = \begin{bmatrix} 1 & 0 & 0 & -R_L \\ 0 & 1 & R_L & 0 \\ 1 & 0 & 0 & R_L \\ 0 & 1 & -R_L & 0 \end{bmatrix} \begin{bmatrix} \delta_{x,LS} \\ \delta_{y,LS} \\ \phi_{x,LS} \\ \phi_{y,LS} \end{bmatrix} \quad (1\text{-}1)$$

$$\begin{bmatrix} \delta_{x,LS} \\ \delta_{y,LS} \\ \phi_{x,LS} \\ \phi_{y,LS} \end{bmatrix} = \begin{bmatrix} \frac{1}{2} & 0 & \frac{1}{2} & 0 \\ 0 & \frac{1}{2} & 0 & \frac{1}{2} \\ 0 & \frac{1}{2R_L} & 0 & -\frac{1}{2R_L} \\ -\frac{1}{2R_L} & 0 & \frac{1}{2R_L} & 0 \end{bmatrix} \begin{bmatrix} L_1 \\ L_2 \\ L_3 \\ L_4 \end{bmatrix} \quad (1\text{-}2)$$

$$\begin{bmatrix} \Delta\theta_{xLS} \\ \Delta\theta_{yLS} \end{bmatrix} = T_{LS} \begin{bmatrix} \delta_{x,LS} \\ \delta_{y,LS} \end{bmatrix} + R_{LS} \begin{bmatrix} \phi_{x,LS} \\ \phi_{y,LS} \end{bmatrix} \quad (1\text{-}3)$$

Moreover, the arrangement method for the first inertial sensors 2 includes all combinations capable of detecting the translational displacement in the x axis direction, the rotational displacement about the y axis, the translational displacement in the y axis direction, and the rotational displacement about the x axis of the laser light source installation part 3.

In the optical axis detection unit 11, the laser light and observed light emitted from the telescope unit 16 are separated from each other, and are split by a beam splitter 7 installed on an optical axis detection system installation part 10, the laser light is guided to an optical axis variation detector 5, and the observed light is guided to an observation sensor 9 via a reflecting mirror 8. The optical axis variation detector 5, the beam splitter 7, the reflecting mirror 8, and the observation sensor 9 are directly Or indirectly fixed to the optical axis detection system installation part 10 sufficient in the rigidity. Moreover, second inertial sensors 6 are installed on the optical axis detection unit 11.

Figure 3:
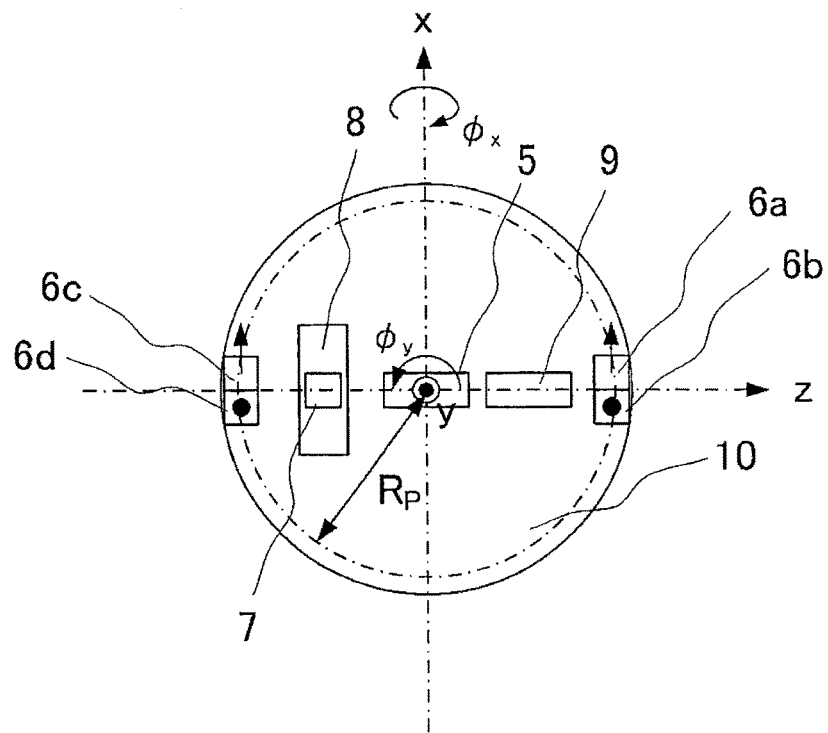
FIG. 3 is a plan view illustrating an optical axis detection unit of the pointing axis estimation apparatus according to the first embodiment of the present invention.

FIG. 3, which is a plan view of the optical axis detection unit 11, illustrates an example of an arrangement method for the second inertial sensors 6. A traveling direction of the laser light is defined as +z axis, a direction coming out perpendicularly from the drawing sheet is defined as +y axis, and an axis acquired by rotating the +z axis by 90 degrees in the counterclockwise direction about the y axis is defined as +x axis. Second inertial sensors 6a and 6c for detecting a translational displacement in the x axis direction and a rotational displacement about the y axis of the optical axis detection unit 11 are arranged so as to detect the displacements in the x axis direction, and second inertial sensors 6b and 6d for detecting a translational displacement in the y axis direction and a rotational displacement about the x axis of the optical axis detection unit 11 are arranged so as to detect the displacements in the y axis direction. Moreover, the second inertial sensors 6a to 6d are arranged on a circle having a radius $R_P$.

A description is now given of a method of detecting the translational displacement in the x axis direction, $\delta_{x,PS}$, the rotational displacement about the x axis, $\phi_{x,PS}$, the translational displacement in the y axis direction, $\delta_{y,PS}$, and the rotational displacement about the y axis, $\phi_{y,PS}$ of the optical axis detection system installation part 10 by using the inertial sensors 6a to 6d illustrated in FIG. 3. When an output of the second inertial sensor 6c is P1, an output of the second inertial sensor 6d is P2, an output of the second inertial sensor 6a is P3, and an output of the second inertial sensor 6b is P4, a relationship between the displacements and the angles of the optical axis detection system installation part 10 and the outputs of the second inertial sensors 6a to 6d is represented by Expression (1-4). The displacements and the angles of the optical axis detection system installation part 10 are acquired from the outputs of the second inertial sensors 6a to 6d by transforming Expression (1-4) as represented by Expression (1-5). On this occasion, when the second inertial sensors output speeds or accelerations, the values acquired by using Expression (1-5) can be converted into the displacements and the angles by means of first-order or second-order integration. Further, when a pointing error optical conversion coefficient for the translational displacements of the optical axis detection system installation part 10 is $T_{PS}$, and a pointing error optical conversion coefficient for the angular displacements of the optical axis detection system installation part 10 is $R_{PS}$, pointing variations caused by the translational displacements and the angular displacements of the optical axis detection system installation part 10 are represented by Expression (1-6). On this occasion, $T_{PS}$ and $R_{PS}$ are calculated by means of optical sensitivity analysis. It should be noted that the calculations by using Expressions (1-4), (1-5), and (1-6) are carried out by an optical axis detection-unit attitude detector 19.

$$\begin{bmatrix} P_1 \\ P_2 \\ P_3 \\ P_4 \end{bmatrix} = \begin{bmatrix} 1 & 0 & 0 & -R_P \\ 0 & 1 & R_P & 0 \\ 1 & 0 & 0 & R_P \\ 0 & 1 & -R_P & 0 \end{bmatrix} \begin{bmatrix} \delta_{x,PS} \\ \delta_{y,PS} \\ \phi_{x,PS} \\ \phi_{y,PS} \end{bmatrix} \quad (1\text{-}4)$$

$$\begin{bmatrix} \delta_{x,PS} \\ \delta_{y,PS} \\ \phi_{x,PS} \\ \phi_{y,PS} \end{bmatrix} = \begin{bmatrix} \frac{1}{2} & 0 & \frac{1}{2} & 0 \\ 0 & \frac{1}{2} & 0 & \frac{1}{2} \\ 0 & \frac{1}{2R_P} & 0 & -\frac{1}{2R_P} \\ -\frac{1}{2R_P} & 0 & \frac{1}{2R_P} & 0 \end{bmatrix} \begin{bmatrix} P_1 \\ P_2 \\ P_3 \\ P_4 \end{bmatrix} \quad (1\text{-}5)$$

$$\begin{bmatrix} \Delta\theta_{xPS} \\ \Delta\theta_{yPS} \end{bmatrix} = T_{PS} \begin{bmatrix} \delta_{x,PS} \\ \delta_{y,PS} \end{bmatrix} + R_{PS} \begin{bmatrix} \phi_{x,PS} \\ \phi_{y,PS} \end{bmatrix} \quad (1\text{-}6)$$

Moreover, the arrangement method for the second inertial sensors 6 includes all combinations capable of detecting the translational displacement in the x axis direction, the rotational displacement about the y axis, the translational displacement in the y axis direction, and the rotational displacement about the x axis of the optical axis detection unit 11. Further, new inertial sensors may be installed on the beam splitter 7 and the reflecting mirror 8 depending on necessity, thereby enabling detection of translational displacements in the y axis direction, rotational displacements about the x axis, translational displacements in the z axis direction, and rotational displacements about the y axis of the beam splitter 7 and the reflecting mirror 8. Also in this case, the arrangement method for the inertial sensors includes all combinations capable of detecting the translational displacements in the y axis direction, the rotational displacements about the x axis, the translational displacements in the z axis direction, and the rotational displacements about the y axis of the beam splitter 7 and the reflecting mirror 8.

In a pointing axis variation estimator 21, the pointing variations of the laser light source unit calculated by the laser light source-unit attitude detector 18 and the pointing variations of the optical axis detection unit calculated by the optical axis detection-unit attitude detector 19 are removed from the pointing axis variations calculated by a pointing axis calculator 20 by using the relational expression represented by Expression (1-7), thereby estimating the true pointing axis variations of the telescope.

$$\begin{bmatrix} \Delta\theta_x \\ \Delta\theta_y \end{bmatrix} = \begin{bmatrix} \Delta\theta_{xS} \\ \Delta\theta_{yS} \end{bmatrix} - \begin{bmatrix} \Delta\theta_{xLS} \\ \Delta\theta_{yLS} \end{bmatrix} - \begin{bmatrix} \Delta\theta_{xPS} \\ \Delta\theta_{yPS} \end{bmatrix} \quad (1\text{-}7)$$

Figure 4:
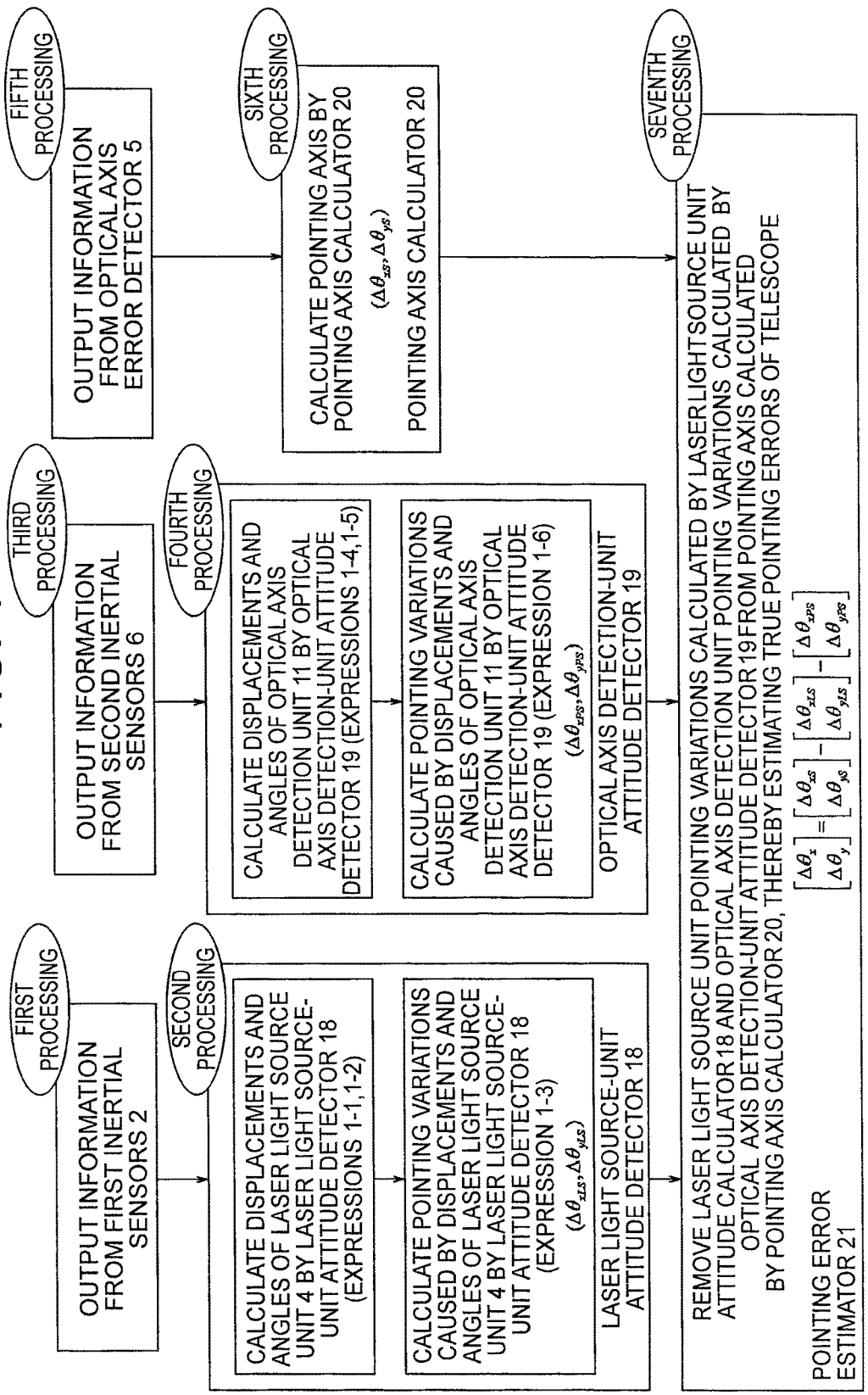
FIG. 4 is a flowchart of pointing axis estimation according to the first embodiment of the present invention.

A flowchart of the pointing axis variation estimation is illustrated in FIG. 4, and a method for the pointing axis variation estimation is summarized below.

In first processing, the laser light source-unit attitude detector 18 acquires the information output from the first inertial sensors 2.

In second processing, the laser light source-unit attitude detector 18 calculates the displacements and the angles of the laser light source unit 4 by using the relational expressions represented by Expressions (1-1) and (1-2), calculates the pointing variations of the laser light source unit 4 by using the relational expression represented by Expression (1-3), and outputs the pointing variations to the pointing axis variation estimator 21.

In third processing, the optical axis detection-unit attitude detector 19 acquires the information output from the second inertial sensors 6.

In fourth processing, the optical axis detection-unit attitude detector 19 calculates the displacements and the angles of the optical axis detection unit 11 by using the relational expressions represented by Expressions (1-4) and (1-5), calculates the pointing variations of the optical axis detection unit 11 by using the relational expression represented by Expression (1-6), and outputs the pointing variations to the pointing axis variation estimator 21.

In fifth processing, the pointing axis calculator 20 acquires information output from the optical axis variation detector 5.

In sixth processing, the pointing axis calculator 20 calculates the pointing variations of the telescope, and inputs the pointing variations to the pointing axis variation estimator 21.

In seventh processing, in the pointing axis variation estimator 21, the pointing variations of the laser light source unit 4 calculated by the laser light source-unit attitude detector 18 and the pointing variations of the optical axis detection unit 11 calculated by the optical axis detection-unit attitude detector 19 are removed from the pointing axis variations calculated by the pointing axis calculator 20 by using the relational expression represented by Expression (1-7), thereby estimating the true pointing axis variations of the telescope.

It should be noted that the first and second processing, the third and fourth processing, and the fifth and sixth processing may be carried out simultaneously in parallel.

Figure 5:
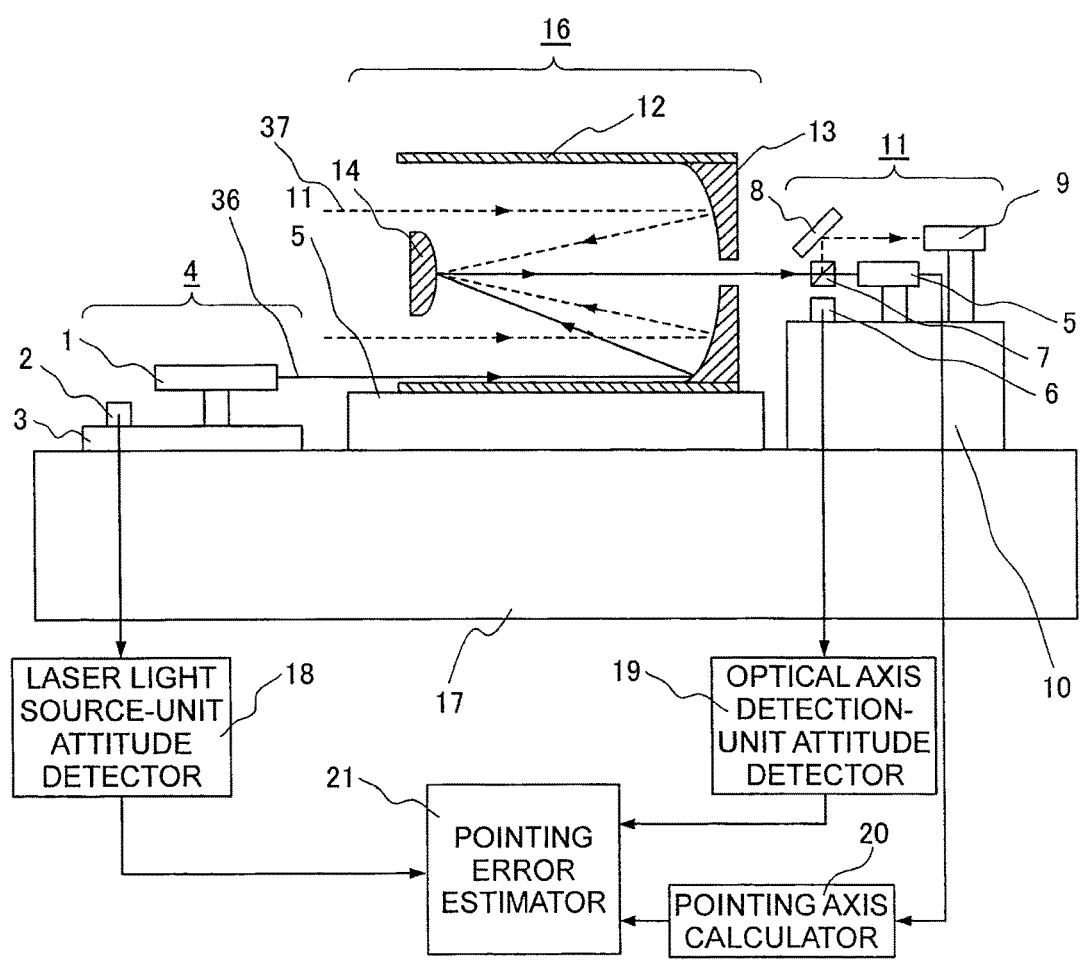
FIG. 5 is a side view illustrating a method (first part) of separating observed light and laser reference light from each other in the pointing axis estimation apparatus according to the first embodiment of the present invention.

Moreover, referring to FIG. 5, a description is now given of an example of a method of separating, by the beam splitter 7, laser reference light 36 and observed light 37 from each other. The laser reference light 36 transmits through the beam splitter so as to enter the optical axis variation detector 5, and simultaneously partially enters the observation sensor 9. It should be noted that the laser reference light 36 is made incident to a position that does not interfere with the observation in the observation sensor 9. It should be noted that such a structure that the laser reference light 36 is polarized, and a polarization beam splitter is used as the beam splitter 7 to transmit most of the laser reference light 36, thereby reducing the influence of the laser reference light 36 on the observation sensor 9 is also included. Moreover, the observed light 37 is reflected by the beam splitter 7 so as to enter the observation sensor 9, and simultaneously partially transmits through the beam splitter 7. Moreover, influence of the observed light 37 on the optical axis variation detector 5 can be eliminated by installing a band-pass filter for transmitting only a wavelength of the laser reference light 36 between the beam splitter 7 and the optical axis variation detector 5.

Figure 6:
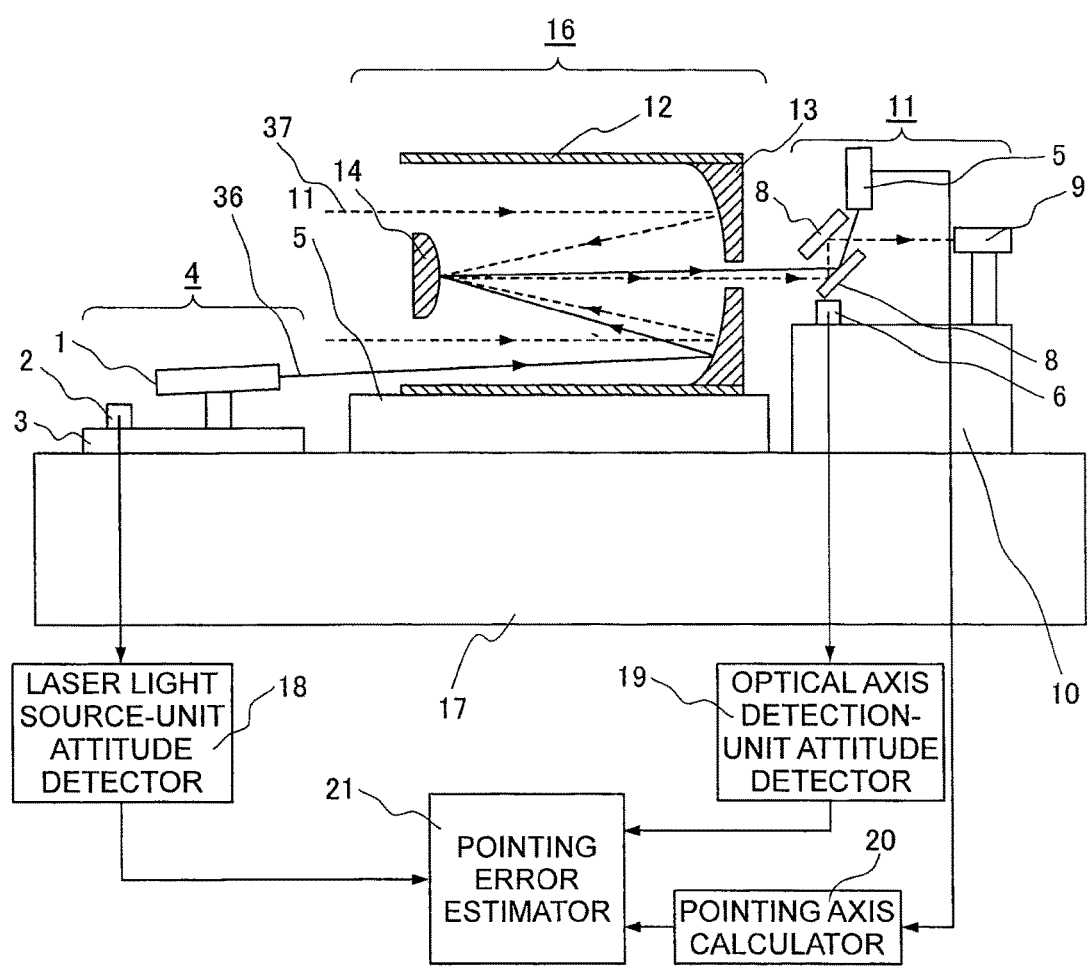
FIG. 6 is a side view illustrating the method (second part) of separating the observed light and the laser reference light from each other in the pointing axis estimation apparatus according to the first embodiment of the present invention.

It should be noted that the laser reference light 36 and the observed light 37 can be separated from each other by using a method other than that illustrated in FIG. 5. For example, as illustrated in FIG. 6, such a method as to tilt the laser reference light 36 so as to enter the telescope unit 16 without being parallel with the observed light 37, thereby separating the laser reference light 36 and the observed light 37 from each other may be employed. When the wavelengths of the observed light and the laser reference light are close to each other, unnecessary light is prevented from entering an observation field of view of the observation sensor 9 by employing the method of FIG. 6. In this method, the observed light 37 may be caused to enter only the observation sensor 9, and the laser reference light 36 may be caused to enter only the optical axis variation detector 5 by using a pair of reflecting mirrors 8 in place of the beam splitter 7, and further adjusting installation angles of the respective reflecting mirrors 8.

As described above, the pointing axis estimation apparatus according to the first embodiment includes the first inertial sensors 2 installed on the laser light source installation part 3 and the laser light source-unit attitude detector 18, and can thus calculate the optical axis variations in the laser light source unit serving as the reference of the pointing axis. Moreover, the pointing axis estimation apparatus according to the first embodiment includes the second inertial sensors 6 installed on the optical axis detection unit 11 and the optical axis detection-unit attitude detector 19, and can thus calculate the optical axis variations caused by the attitude changes in the optical axis detection unit for detecting the laser optical axis variations. Further, the pointing axis variations including the factors other than the telescope pointing axis variations can be calculated by the optical axis variation detector 5 and the pointing axis calculator 20, and the true pointing axis variations of the telescope can be estimated by the pointing axis variation estimator 21 by removing the pointing axis variations caused by the factors other than the telescope pointing axis variations.

Moreover, the pointing axis estimation apparatus according to the first embodiment is configured so that the telescope pointing axis variations reflecting the influence of all the optical component devices ranging from an incident opening of the telescope unit 16 to the optical axis variation detector 5 can be directly detected not by installing inertial sensors on optical component devices including the primary mirror 13 and the secondary mirror 14 of the telescope unit 16, and devices not shown but installed between the telescope unit 16 and the optical axis variation detector 5, and observing variations of the respective optical component devices, thereby indirectly estimating the telescope pointing axis variations, but by causing the laser light emitted from the laser light source 1, which serve as the reference of the pointing axis, to enter the telescope unit 16, guiding the laser light to the optical axis variation detector at the final end, and directly observing the telescope pointing axis variations by using the optical axis variation detector 5. This configuration eliminates the necessity of installing inertial sensors on the respective optical component devices, and can thus provide such a remarkable effect that the telescope pointing axis variations including the influence caused by variations of optical component devices such as a small lens on which an inertial sensor cannot be installed can be highly precisely estimated. Further, even in a case in which a reference of the pointing axis such as a fixed star or a landmark does not exist, the laser light emitted from the laser light source 1, which serves as the reference of the pointing axis, exists. Therefore, such a remarkable effect that the telescope pointing axis variations can be always detected is provided.

In addition, for a telescope or an observation device installed on an artificial satellite, a method of increasing a rigidity of a structural part such as a structure or a support mechanism for mutually supporting the telescope and the observation device, a method of inserting a vibration isolation apparatus between the telescope or the observation apparatus and a mounting part thereof, and the like exist in order to suppress the pointing axis variations of the telescope or the observation device. However, when these methods are employed, the size and weight of the device highly possibly increase, and it is conceivable that launching by using a rocket becomes difficult in some cases. This configuration provides such remarkable effects as permitting a rigidity of the structure part to be as high as the related-art case, avoiding the increases in the size and the weight of the devices, and enabling estimation of the true pointing axis variations of the telescope.

Second Embodiment

Figure 7:
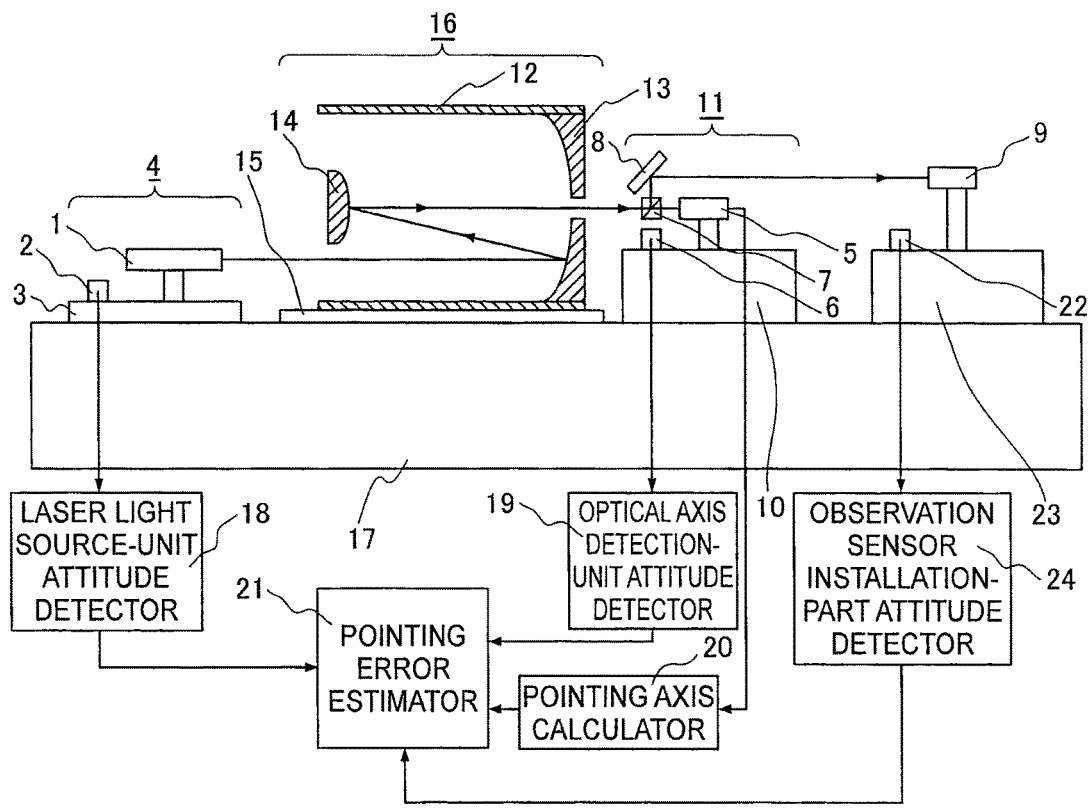
FIG. 7 is a side view illustrating a pointing axis estimation apparatus according to a second embodiment of the present invention.

In FIG. 1, the optical axis detection unit 11 and the observation sensor 9 are mounted on the optical axis detection system installation part 10, but, as illustrated in FIG. 7, such a configuration that the optical axis detection unit 11 is mounted on the optical axis detection system installation part 10, and the observation sensor 9 is mounted on an observation sensor installation part 23, thereby separating the optical axis detection unit 11 and the observation sensor 9 from each other may be provided. The observation sensor 9 and third inertial sensors 22 are installed on the observation sensor installation part 23. The observation sensor 9 is fixed to the observation sensor installation part 23 sufficient in the rigidity.

Figure 8:
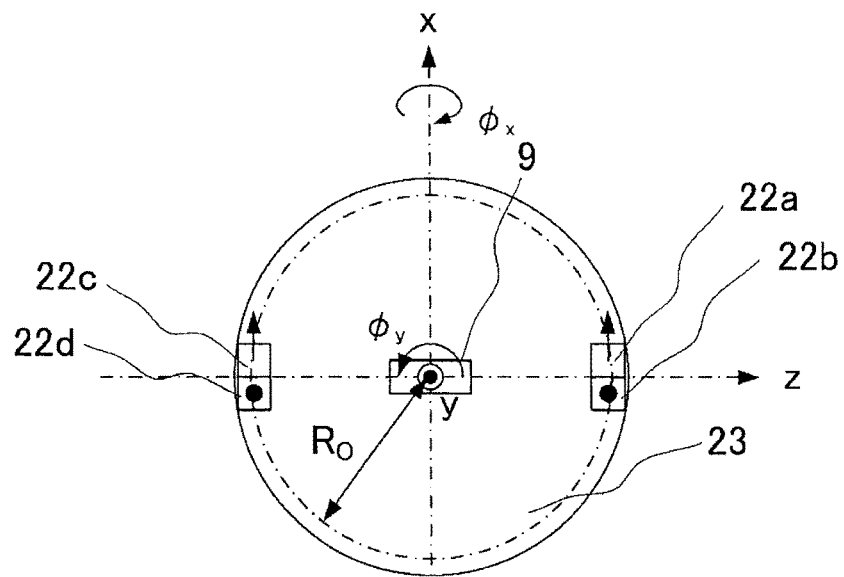
FIG. 8 is a plan view of an observation sensor and third inertial sensors mounted on an observation sensor installation part of the pointing axis estimation apparatus according to the second embodiment of the present invention.

FIG. 8, which is a plan view of the observation sensor installation part 23, illustrates an example of an arrangement method for the third inertial sensors 22. A traveling direction of the observation light is defined as +z axis, a direction coming out perpendicularly from the drawing sheet is defined as +y axis, and an axis acquired by rotating the +z axis by 90 degrees in the counterclockwise direction about the y axis is defined as +x axis. Third inertial sensors 22a and 22c for detecting a translational displacement in the x axis direction and a rotational displacement about the y axis of the observation sensor installation part 23 are arranged so as to detect the displacements in the x axis direction, and third inertial sensors 22b and 22d for detecting a translational displacement in the y axis direction and a rotational displacement about the x axis of the observation sensor installation part 23 are arranged so as to detect the displacements in the y axis direction. Moreover, the third inertial sensors 22a to 22d are arranged on a circle having a radius $R_O$.

A description is now given of a method of detecting the translational displacement in the x axis direction, $\delta_{x,OS}$, the rotational displacement about the x axis, $\phi_{x,OS}$, the translational displacement in the y axis direction, $\phi_{y,OS}$, and the rotational displacement about the y axis, $\phi_{y,OS}$ of the observation sensor installation part 23 by using the third inertial sensors illustrated in FIG. 8. When an output of the third inertial sensor 22c is O1, an output of the third inertial sensor 22d is O2, an output of the third inertial sensor 22a is O3, and an output of the third inertial sensor 22b is O4, a relationship between the translational displacements and the angular displacements of the observation sensor installation part 23 and the outputs of the third inertial sensors 22a to 22d is represented by Expression (2-1). The translational displacements and the angular displacements of the observation sensor installation part 23 are acquired from the outputs of the third inertial sensors 22a to 22d by transforming Expression (2-1) as represented by Expression (2-2). On this occasion, when the third inertial sensors output speeds or accelerations, the values acquired by using Expression (2-2) can be converted into the translational displacements and the angular displacements by means of first-order or second-order integration. Further, when a pointing error optical conversion coefficient for the translational displacements of the observation sensor installation part 23 is $T_{OS}$, and a pointing error optical conversion coefficient for the angular displacements of the observation sensor installation part 23 is $R_{OS}$, pointing variations caused by the translational displacements and the angular displacements of the observation sensor installation part 23 are represented by Expression (2-3). On this occasion, $T_{OS}$ and $R_{OS}$ are calculated by means of optical sensitivity analysis. It should be noted that the calculations by using Expressions (2-1), (2-2), and (2-3) are carried out by an observation sensor installation-part attitude detector 24.

$$\begin{bmatrix} O_1 \\ O_2 \\ O_3 \\ O_4 \end{bmatrix} = \begin{bmatrix} 1 & 0 & 0 & -R_O \\ 0 & 1 & R_O & 0 \\ 1 & 0 & 0 & R_O \\ 0 & 1 & -R_O & 0 \end{bmatrix} \begin{bmatrix} \delta_{x,OS} \\ \delta_{y,OS} \\ \phi_{x,OS} \\ \phi_{y,OS} \end{bmatrix} \quad (2\text{-}1)$$

$$\begin{bmatrix} \delta_{x,OS} \\ \delta_{y,OS} \\ \phi_{x,OS} \\ \phi_{y,OS} \end{bmatrix} = \begin{bmatrix} \frac{1}{2} & 0 & \frac{1}{2} & 0 \\ 0 & \frac{1}{2} & 0 & \frac{1}{2} \\ 0 & \frac{1}{2R_O} & 0 & -\frac{1}{2R_O} \\ -\frac{1}{2R_O} & 0 & \frac{1}{2R_O} & 0 \end{bmatrix} \begin{bmatrix} O_1 \\ O_2 \\ O_3 \\ O_4 \end{bmatrix} \quad (2\text{-}2)$$

$$\begin{bmatrix} \Delta\theta_{xOS} \\ \Delta\theta_{yOS} \end{bmatrix} = T_{OS} \begin{bmatrix} \delta_{x,OS} \\ \delta_{y,OS} \end{bmatrix} + R_{OS} \begin{bmatrix} \phi_{x,OS} \\ \phi_{y,OS} \end{bmatrix} \quad (2\text{-}3)$$

Moreover, the arrangement method for the third inertial sensors includes all combinations capable of detecting the translational displacement in the x axis direction, the rotational displacement about the y axis, the translational displacement in the y axis direction, and the rotational displacement about the x axis of the observation sensor installation part 23. Further, the configuration of the optical axis detection unit 11 is the same as that of FIG. 3.

In the pointing axis variation estimator 21, the true pointing axis variations of the telescope are estimated by removing the pointing variations of the laser light source unit calculated by the laser light source-unit attitude detector 18 and the pointing variations of the optical axis detection unit calculated by the optical axis detection-unit attitude detector 19 from the pointing axis variations calculated by the pointing axis calculator 20 by using the relational expression represented by Expression (2-4), and further considering relative attitude variations between the pointing variations of the observation sensor installation part calculated by the observation sensor installation-part attitude detector 24 and attitude variations of the optical axis detection unit calculated by the optical axis detection-unit attitude detector 19. Moreover, when a relative attitude variation value between the pointing axis variations on the optical axis variation detector 5 and the pointing axis variations on the observation sensor 9 are more than a certain threshold, the optical axis detection unit and the observation sensor installation part are determined to be abnormal.

$$\begin{bmatrix} \Delta\bar{\theta}_x \\ \Delta\bar{\theta}_y \end{bmatrix} = \begin{bmatrix} \Delta\theta_{xOS} \\ \Delta\theta_{yOS} \end{bmatrix} - \begin{bmatrix} \Delta\theta_{xPS} \\ \Delta\theta_{yPS} \end{bmatrix} \quad (2\text{-}4)$$

$$\begin{bmatrix} \Delta\theta_x \\ \Delta\theta_y \end{bmatrix} = \begin{bmatrix} \Delta\theta_{xS} \\ \Delta\theta_{yS} \end{bmatrix} - \begin{bmatrix} \Delta\theta_{xLS} \\ \Delta\theta_{yLS} \end{bmatrix} - \begin{bmatrix} \Delta\theta_{xPS} \\ \Delta\theta_{yPS} \end{bmatrix} - \begin{bmatrix} \Delta\bar{\theta}_x \\ \Delta\bar{\theta}_y \end{bmatrix}$$

Figure 9:
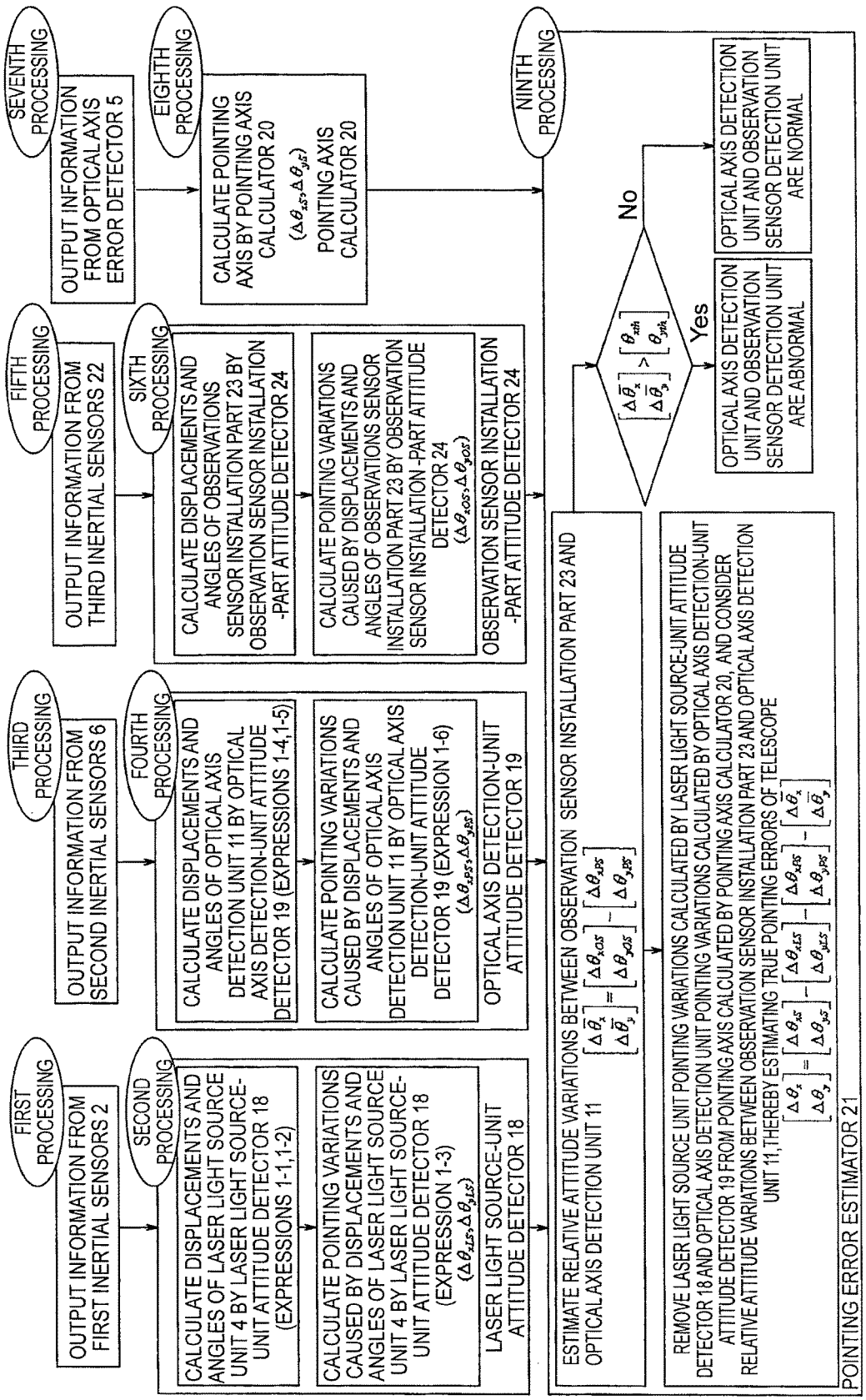
FIG. 9 is a flowchart of the pointing axis estimation according to the second embodiment of the present invention.

A flowchart of the pointing axis variation estimation is illustrated in FIG. 9, and a method for the pointing axis variation estimation is summarized below.

In first processing, the laser light source-unit attitude detector 18 acquires the information output from the first inertial sensors 2.

In second processing, the laser light source-unit attitude detector 18 calculates the displacements and the angles of the laser light source unit 4 by using the relational expressions represented by Expressions (1-1) and (1-2), calculates the pointing variations of the laser light source unit 4 by using the relational expression represented by Expression (1-3), and outputs the pointing variations to the pointing axis variation estimator 21.

In third processing, the optical axis detection-unit attitude detector 19 acquires the information output from the second inertial sensors 6.

In fourth processing, the optical axis detection-unit attitude detector 19 calculates the displacements and the angles of the optical axis detection unit 11 by using the relational expressions represented by Expressions (1-4) and (1-5), calculates the pointing variations of the optical axis detection unit 11 by using the relational expression represented by Expression (1-6), and outputs the pointing variations to the pointing axis variation estimator 21.

In fifth processing, the observation sensor installation-part attitude detector 24 acquires information output from the third inertial sensors 22.

In sixth processing, the observation sensor installation-part attitude detector 24 calculates the displacements and the angles of the observation sensor installation part 23 by using the relational expressions represented by Expressions (2-1) and (2-2), calculates the pointing variations of the observation sensor installation part 23 by using the relational expression represented by Expression (2-3), and outputs the pointing variations to the pointing axis variation estimator 21.

In seventh processing, the pointing axis calculator 20 acquires information output from the optical axis variation detector 5.

In eighth processing, the pointing axis calculator 20 calculates the pointing variations of the telescope, and inputs the pointing variations to the pointing axis variation estimator 21.

In ninth processing, in the pointing axis variation estimator 21, the pointing variations of the laser light source unit 4 calculated by the laser light source-unit attitude detector 18 and the pointing variations of the optical axis detection unit 11 calculated by the optical axis detection-unit attitude detector 19 are removed from the pointing axis variations calculated by the pointing axis calculator 20 by using the relational expression represented by Expression (2-4), and further the relative attitude variations between the pointing variations of the observation sensor installation part 23 calculated by the observation sensor installation-part attitude detector 24 and the attitude variations of the optical axis detection unit 11 calculated by the optical axis detection-unit attitude detector 19 are considered, thereby estimating the true pointing axis variations of the telescope.

It should be noted that the first and second processing, the third and fourth processing, the fifth and sixth processing, and the seventh and eighth processing may be carried out simultaneously in parallel.

As described above, the pointing axis estimation apparatus according to the second embodiment includes the second inertial sensors 6 installed on the optical axis detection unit 11 and the optical axis detection-unit attitude detector 19, and can thus calculate the optical axis variations caused by the attitude changes in the optical axis detection unit for detecting the laser optical axis variations. Moreover, the pointing axis estimation apparatus according to the second embodiment includes the third inertial sensors 22 installed on the observation sensor installation part 23 and the observation sensor installation-part attitude detector 24, and can thus calculate the optical axis variations caused by the attitude changes in the observation sensor installation part. Further, the relative attitude variations between the pointing axis variations on the optical axis variation detector 5 and the pointing axis variations on the observation sensor 9 can be calculated, and when the relative attitude variation value is more than the certain threshold, the optical axis detection unit and the observation sensor installation part can be detected to be abnormal. In addition, the optical axis variation detector and the observation sensor can be arranged so as to be separated from each other, and a degree of freedom in the arrangement of the optical axis variation detector and the observation sensor can thus be increased.

Third Embodiment

Figure 10:
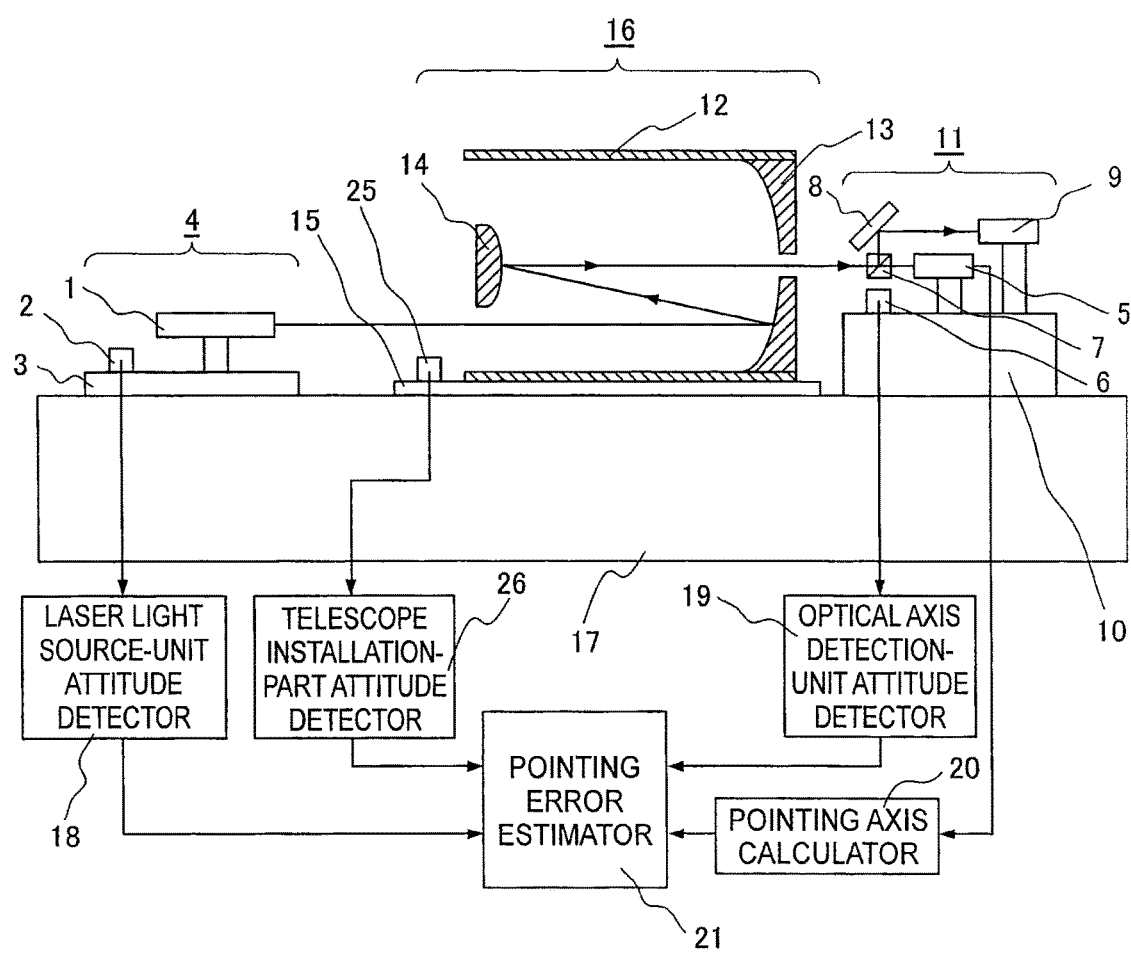
FIG. 10 is a side view illustrating a pointing axis estimation apparatus according to a third embodiment of the present invention.

In FIG. 1, inertial sensors are not installed on the telescope installation part 15, but, as illustrated in FIG. 10, such a configuration that fourth inertial sensors 25 are installed on the telescope installation part 15 may be provided. It should be noted that the telescope installation part 15 to which the body tube 12 is fixed is sufficient in the rigidity.

Figure 11:
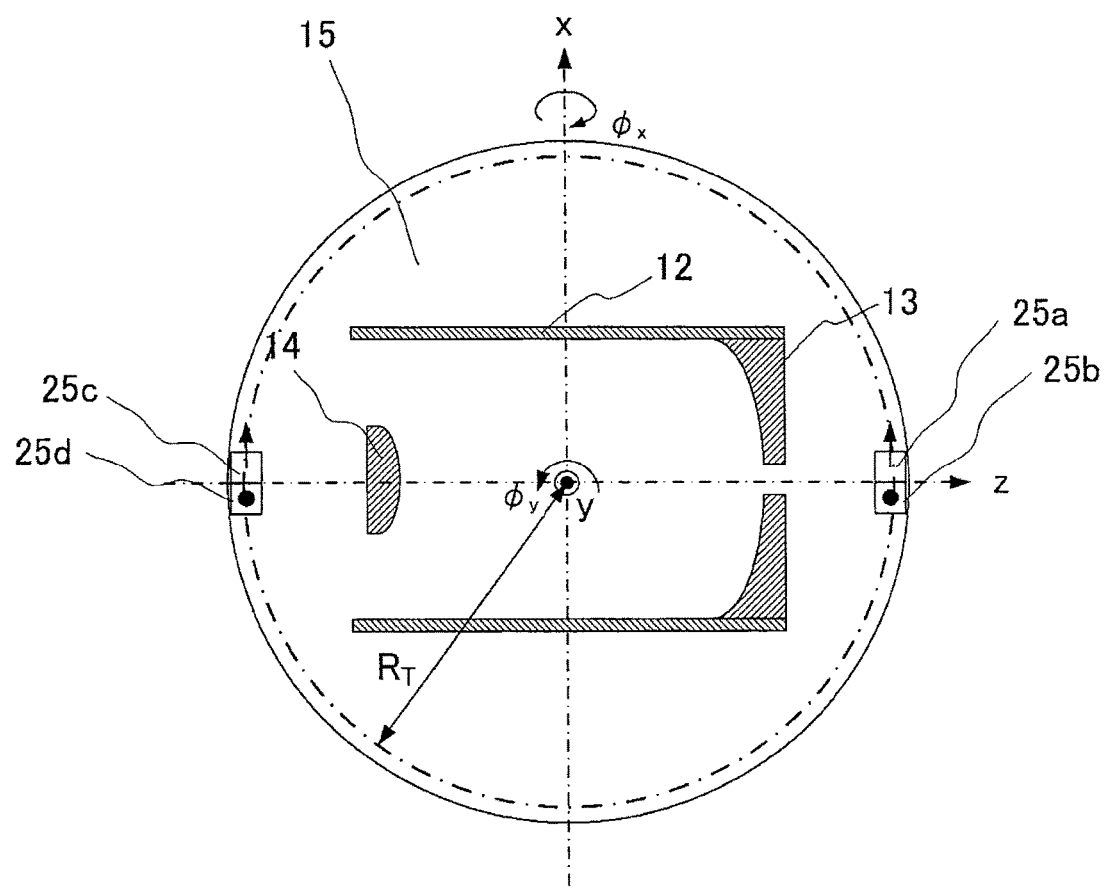
FIG. 11 is a plan view illustrating a telescope installation part of the pointing axis estimation apparatus according to the third embodiment of the present invention.

FIG. 11, which is a plan view of the telescope installation part 15, illustrates an example of an arrangement method for the fourth inertial sensors 25. A traveling direction of the laser light is defined as +z axis, a direction coming out perpendicularly from the drawing sheet is defined as +y axis, and an axis acquired by rotating the +z axis by 90 degrees in the counterclockwise direction about the y axis is defined as +x axis. Fourth inertial sensors 25a and 25c for detecting a translational displacement in the x axis direction and a rotational displacement about the y axis of the telescope installation part 15 are arranged so as to detect the displacements in the x axis direction, and fourth inertial sensors 25b and 25d for detecting a translational displacement in the y axis direction and a rotational displacement about the x axis of the telescope installation part 15 are arranged so as to detect the displacements in the y axis direction. Moreover, the fourth inertial sensors 25a to 25d are arranged on a circle having a radius $R_T$.

A description is now given of a method of detecting the translational displacement in the x axis direction, $\delta_{x,TS}$, the rotational displacement about the x axis, $\phi_{x,TS}$, the translational displacement in the y axis direction, $\delta_{y,TS}$, and the rotational displacement about the y axis, $\phi_{y,TS}$ of the telescope installation part 15 by using the fourth inertial sensors illustrated in FIG. 11. When an output of the fourth inertial sensor 25c is T1, an output of the fourth inertial sensor 25d is T2, an output of the fourth inertial sensor 25a is T3, and an output of the fourth inertial sensor 25b is T4, a relationship between the translational displacements and the angular displacements of the telescope installation part 15 and the outputs of the fourth inertial sensors 25a to 25d is represented by Expression (3-1). The translational displacements and the angular displacements of the telescope installation part 15 are acquired from the outputs of the fourth inertial sensors 25a to 25d by transforming Expression (3-1) as represented by Expression (3-2). On this occasion, when the fourth inertial sensors output speeds or accelerations, the values acquired by using Expression (3-2) can be converted into the translational displacements and the angular displacements by means of first-order or second-order integration. Further, when a pointing error optical conversion coefficient for the translational displacements of the telescope installation part 15 is $T_{TS}$, and a pointing error optical conversion coefficient for the angular displacements of the telescope installation part 15 is $R_{TS}$, pointing variations caused by the translational displacements and the angular displacements of the telescope installation part 15 are represented by Expression (3-3). On this occasion, $T_{TS}$ and $R_{TS}$ are calculated by means of optical sensitivity analysis. It should be noted that the calculations by using Expressions (3-1), (3-2), and (3-3) are carried out by a telescope installation-part attitude detector 26.

$$\begin{bmatrix} T_1 \\ T_2 \\ T_3 \\ T_4 \end{bmatrix} = \begin{bmatrix} 1 & 0 & 0 & -R_T \\ 0 & 1 & R_T & 0 \\ 1 & 0 & 0 & R_T \\ 0 & 1 & -R_T & 0 \end{bmatrix} \begin{bmatrix} \delta_{x,TS} \\ \delta_{y,TS} \\ \phi_{x,TS} \\ \phi_{y,TS} \end{bmatrix} \quad (3\text{-}1)$$

$$\begin{bmatrix} \delta_{x,TS} \\ \delta_{y,TS} \\ \phi_{x,TS} \\ \phi_{y,TS} \end{bmatrix} = \begin{bmatrix} \frac{1}{2} & 0 & \frac{1}{2} & 0 \\ 0 & \frac{1}{2} & 0 & \frac{1}{2} \\ 0 & \frac{1}{2R_T} & 0 & -\frac{1}{2R_T} \\ -\frac{1}{2R_T} & 0 & \frac{1}{2R_T} & 0 \end{bmatrix} \begin{bmatrix} T_1 \\ T_2 \\ T_3 \\ T_4 \end{bmatrix} \quad (3\text{-}2)$$

-continued $$\begin{bmatrix} \Delta\theta_{xTS} \\ \Delta\theta_{yTS} \end{bmatrix} = T_{TS} \begin{bmatrix} \delta_{x,TS} \\ \delta_{y,TS} \end{bmatrix} + R_{TS} \begin{bmatrix} \phi_{x,TS} \\ \phi_{y,TS} \end{bmatrix} \quad (3\text{-}3)$$

Moreover, the arrangement method for the fourth inertial sensors includes all combinations capable of detecting the translational displacement in the x axis direction, the rotational displacement about the y axis, the translational displacement in the y axis direction, and the rotational displacement about the x axis of the telescope installation part 15.

In the pointing axis variation estimator 21, the true pointing axis variations of the telescope are estimated by removing the pointing variations of the laser light source unit calculated by the laser light source-unit attitude detector 18 and the pointing variations of the optical axis detection unit calculated by the optical axis detection-unit attitude detector 19 from the pointing axis variations calculated by the pointing axis calculator 20 by using the relational expression represented by Expression (3-4), and further removing the pointing variations of the telescope installation part calculated by the telescope installation-part attitude detector 26 therefrom. Moreover, the difference between the true pointing axis estimated value of the telescope and the pointing variations caused by the displacements and the angles of the telescope installation part 15 is calculated. When the difference value is 0, the pointing axis variations are determined not to be caused by the attitude changes of the telescope installation part. When the difference value is not 0, it is determined that the factors causing the pointing axis variations include the attitude changes in the telescope installation part.

$$\begin{bmatrix} \Delta\tilde{\theta}_x \\ \Delta\tilde{\theta}_y \end{bmatrix} = \begin{bmatrix} \Delta\theta_{xTS} \\ \Delta\theta_{yTS} \end{bmatrix} - \begin{bmatrix} \Delta\theta_x \\ \Delta\theta_y \end{bmatrix} \quad (3\text{-}4)$$

$$\begin{bmatrix} \Delta\theta_x \\ \Delta\theta_y \end{bmatrix} = \begin{bmatrix} \Delta\theta_{xS} \\ \Delta\theta_{yS} \end{bmatrix} - \begin{bmatrix} \Delta\theta_{xLS} \\ \Delta\theta_{yLS} \end{bmatrix} - \begin{bmatrix} \Delta\theta_{xPS} \\ \Delta\theta_{yPS} \end{bmatrix}$$

Figure 12:
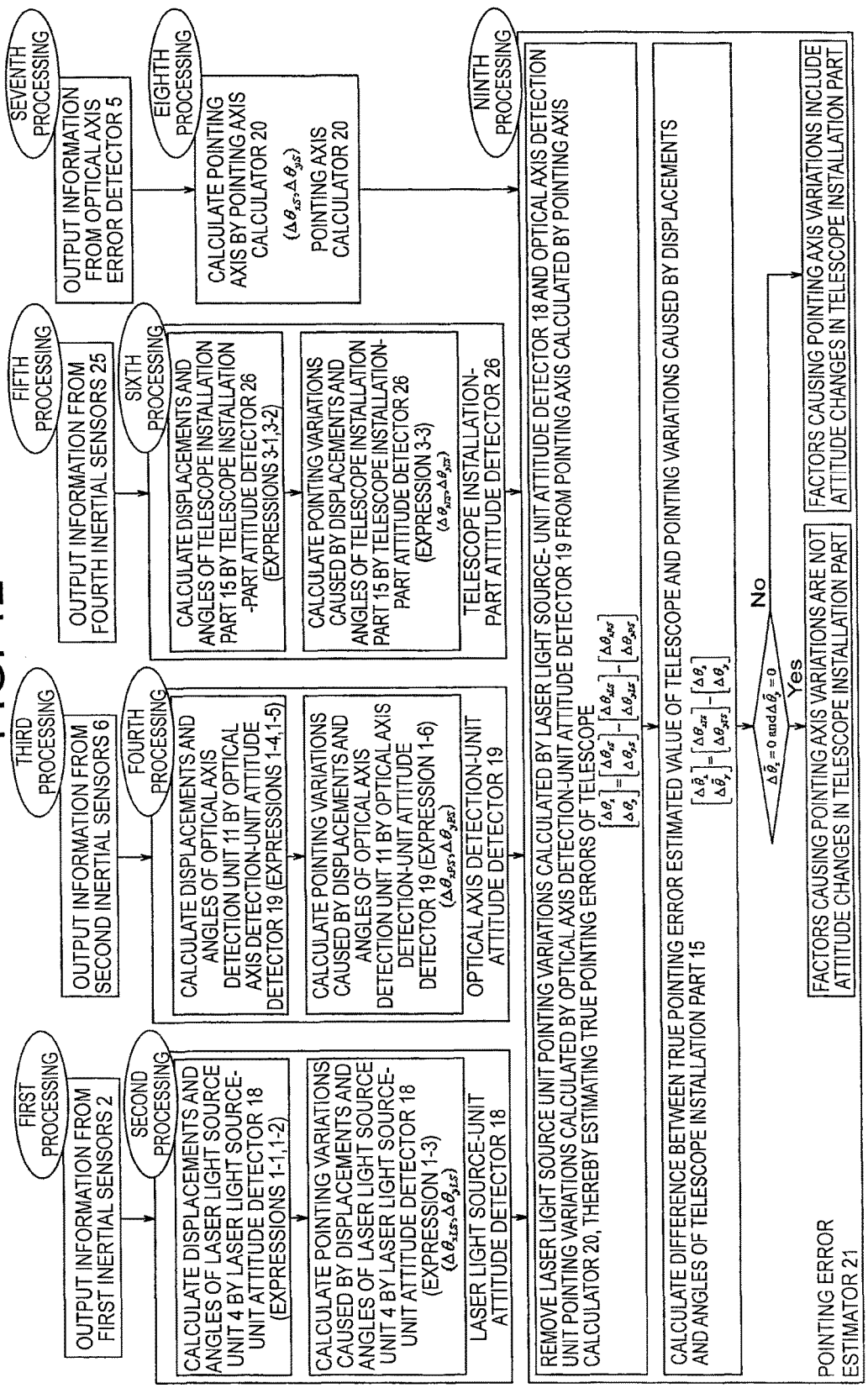
FIG. 12 is a flowchart of the pointing axis estimation according to the third embodiment of the present invention.

A flowchart of the pointing axis variation estimation is illustrated in FIG. 12, and a method for the pointing axis variation estimation is summarized below.

In first processing, the laser light source-unit attitude detector 18 acquires the information output from the first inertial sensors 2.

In second processing, the laser light source-unit attitude detector 18 calculates the displacements and the angles of the laser light source unit 4 by using the relational expressions represented by Expressions (1-1) and (1-2), calculates the pointing variations of the laser light source unit 4 by using the relational expression represented by Expression (1-3), and outputs the pointing variations to the pointing axis variation estimator 21.

In third processing, the optical axis detection-unit attitude detector 19 acquires the information output from the second inertial sensors 6.

In fourth processing, the optical axis detection-unit attitude detector 19 calculates the displacements and the angles of the optical axis detection unit 11 by using the relational expressions represented by Expressions (1-4) and (1-5), calculates the pointing variations of the optical axis detection unit 11 by using the relational expression represented by Expression (1-6), and outputs the pointing variations to the pointing axis variation estimator 21.

In fifth processing, the telescope installation-part attitude detector 26 acquires information output from the fourth inertial sensors 25.

In sixth processing, the telescope installation-part attitude detector 26 calculates the displacements and the angles of the telescope installation part 15 by using the relational expressions represented by Expressions (3-1) and (3-2), calculates the pointing variations of the telescope installation part 15 by using the relational expression represented by Expression (3-3), and outputs the pointing variations to the pointing axis variation estimator 21.

In seventh processing, the pointing axis calculator 20 acquires information output from the optical axis variation detector 5.

In eighth processing, the pointing axis calculator 20 calculates the pointing variations of the telescope, and inputs the pointing variations to the pointing axis variation estimator 21.

In ninth processing, in the pointing axis variation estimator 21, the pointing variations of the laser light source unit 4 calculated by the laser light source-unit attitude detector 18 and the pointing variations of the optical axis detection unit 11 calculated by the optical axis detection-unit attitude detector 19 are removed from the pointing axis variations calculated by the pointing axis calculator 20 by using the relational expression represented by Expression (3-4), thereby estimating the true pointing axis variations of the telescope. Further, the difference between the pointing variations of the telescope installation part 15 calculated by the telescope installation-part attitude detector 26 and the true pointing axis variation estimated value of the telescope is calculated, and whether or not the factors causing the pointing axis variations include the attitude changes in the telescope installation part is determined.

It should be noted that the first and second processing, the third and fourth processing, the fifth and sixth processing, and the seventh and eighth processing may be carried out simultaneously in parallel.

As described above, the pointing axis estimation apparatus according to the third embodiment includes the forth inertial sensors 25 installed on the telescope installation part 15 and the telescope installation-part attitude detector 26. The pointing axis estimation apparatus according to the third embodiment can thus calculate the optical axis variations caused by the attitude changes in the telescope installation part, and can determine that the pointing axis variations of the telescope are caused by the attitude changes in the telescope installation part.

Fourth Embodiment

Figure 13:
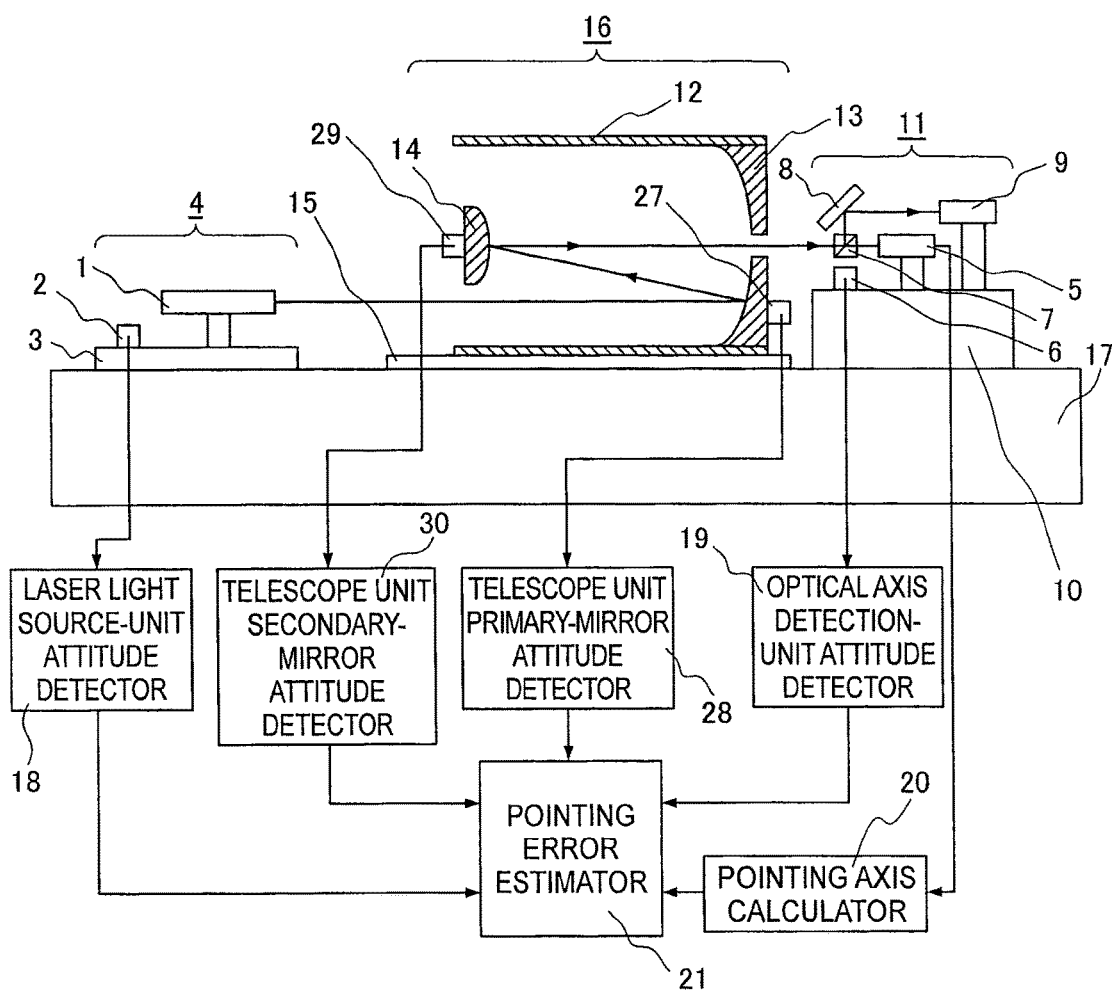
FIG. 13 is a side view illustrating a pointing axis estimation apparatus according to a fourth embodiment of the present invention.

In FIG. 1, inertial sensors are not installed on the primary mirror 13 and the secondary mirror 14 of the telescope unit, but, as illustrated in FIG. 13, such a configuration that fifth inertial sensors 27 are installed on the primary mirror 13, and sixth inertial sensors 29 are installed on the secondary mirror 14 may be provided.

Figure 14:
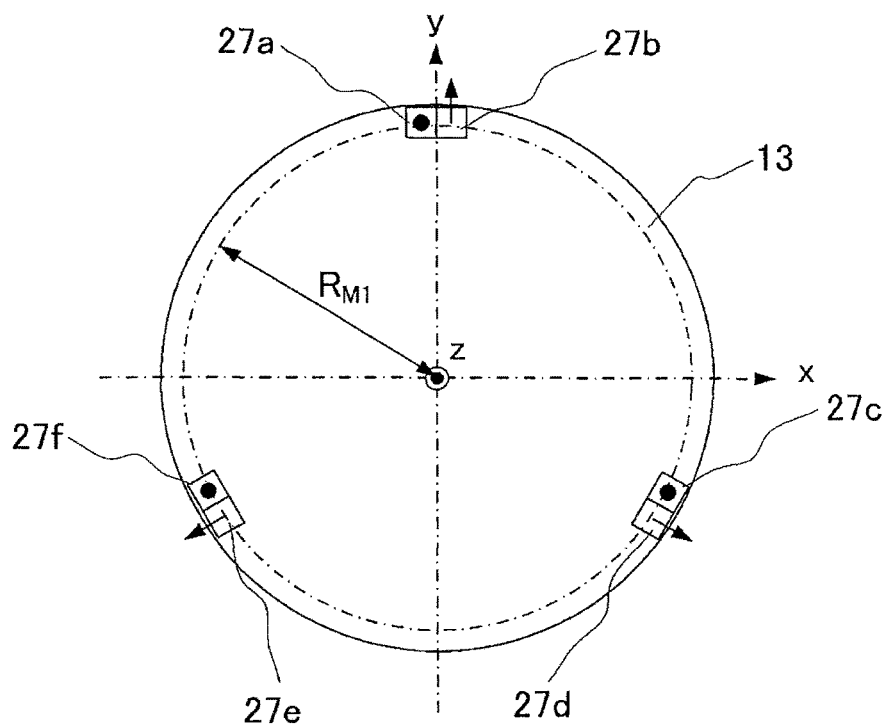
FIG. 14 is a rear view illustrating fifth inertial sensors mounted on a primary mirror of a telescope unit of the pointing axis estimation apparatus according to the fourth embodiment of the present invention.

FIG. 14, which is a rear view of the primary mirror 13 (viewed from the right side in FIG. 13), illustrates an example of an arrangement method for the fifth inertial sensors 27. On this occasion, the coordinate axes are defined as in FIGS. 2 and 3. Fifth inertial sensors 27d and 27e for detecting the translational displacement in the x axis direction of the primary mirror are arranged so as to detect the displacements in the x axis direction, a fifth inertial sensor 27b for detecting the translational displacement in the y axis direction of the primary mirror is arranged so as to detect the displacements in the y axis direction, and fifth inertial sensors 27a, 27c, and 27f for detecting the rotational displacements about the x axis and the y axis of the primary mirror are arranged so as to detect the displacements in the z axis direction. It should be noted that the arrangement method for the fifth inertial sensors includes all combinations capable of detecting the translational displacement in the x axis direction, the translational displacement in the y axis direction, the rotational displacement about the x axis, and the rotational displacement about the y axis of the primary mirror 13. Moreover, the arrangement method for the fifth inertial sensors includes such an arrangement that any one of the fifth inertial sensors 27c and 27f is not installed, and such an arrangement that any one of the fifth inertial sensors 27d and 27e is not installed. Moreover, the fifth inertial sensors 27a to 27f are arranged on a circle having a radius $R_{M1}$.

A description is now given of a method of detecting the translational displacement in the x axis direction, $\delta_{x,M1}$, the rotational displacement about the x axis, $\phi_{x,M1}$, the translational displacement in the y axis direction, $\delta_{y,M1}$, and the rotational displacement about the y axis, $\phi_{y,M1}$ of the primary mirror 13 of the telescope unit by using the fifth inertial sensors illustrated in FIG. 14. When an output of the fifth inertial sensor 27a is M1, an output of the fifth inertial sensor 27c is M2, an output of the fifth inertial sensor 27f is M3, an output of the fifth inertial sensor 27b is M4, an output of the fifth inertial sensor 27d is M5, and an output of the fifth inertial sensor 27e is M6, a relationship between the translational displacements and the angular displacements of the primary mirror 13 of the telescope unit and the outputs of the fifth inertial sensors 27a to 27f is represented by Expression (4-1). The translational displacements and the angular displacements of the primary mirror 13 of the telescope unit are acquired from the outputs of the fifth inertial sensors 27a to 27f by transforming Expression (4-1) as represented by Expression (4-2). On this occasion, when the fifth inertial sensors output speeds or accelerations, the values acquired by using Expression (4-2) can be converted into the translational displacements and the angular displacements by means of first-order or second-order integration. Further, when a pointing error optical conversion coefficient for the translational displacements of the primary mirror 13 of the telescope unit is $T_{M1}$, and a pointing error optical conversion coefficient for the angular displacements of the primary mirror 13 of the telescope unit is $R_{M1}$, pointing variations caused by the translational displacements and the angular displacements of the primary mirror 13 of the telescope unit are represented by Expression (4-3). On this occasion, $T_{M1}$ and $R_{M1}$ are calculated by means of optical sensitivity analysis. It should be noted that the calculations by using Expressions (4-1), (4-2), and (4-3) are carried out by a telescope unit primary-mirror attitude detector 28.

$$\begin{bmatrix} M_1 \\ M_2 \\ M_3 \\ M_4 \\ M_5 \\ M_6 \end{bmatrix} = \begin{bmatrix} 0 & 0 & 1 & R_{M1} & 0 \\ 0 & 0 & 1 & -\frac{R_{M1}}{2} & -\frac{\sqrt{3}}{2}R_{M1} \\ 0 & 0 & 1 & -\frac{R_{M1}}{2} & \frac{\sqrt{3}}{2}R_{M1} \\ 0 & 1 & 0 & 0 & 0 \\ \frac{\sqrt{3}}{2} & -\frac{1}{2} & 0 & 0 & 0 \\ -\frac{\sqrt{3}}{2} & -\frac{1}{2} & 0 & 0 & 0 \end{bmatrix} \begin{bmatrix} \delta_{x,M1} \\ \delta_{y,M1} \\ \delta_{z,M1} \\ \phi_{x,M1} \\ \phi_{y,M1} \end{bmatrix} \quad (4\text{-}1)$$

$$\begin{bmatrix} \delta_{x,M1} \\ \delta_{y,M1} \\ \delta_{z,M1} \\ \phi_{x,M1} \\ \phi_{y,M1} \end{bmatrix} = \begin{bmatrix} 0 & 0 & 0 & 0 & \frac{1}{\sqrt{3}} & -\frac{1}{\sqrt{3}} \\ 0 & 0 & 0 & \frac{2}{3} & -\frac{1}{3} & -\frac{1}{3} \\ \frac{1}{3} & \frac{1}{3} & \frac{1}{3} & 0 & 0 & 0 \\ \frac{2}{3R_{M1}} & -\frac{1}{3R_{M1}} & -\frac{1}{3R_{M1}} & 0 & 0 & 0 \\ 0 & -\frac{1}{\sqrt{3}\,R_{M1}} & \frac{1}{\sqrt{3}\,R_{M1}} & 0 & 0 & 0 \end{bmatrix} \begin{bmatrix} M_1 \\ M_2 \\ M_3 \\ M_4 \\ M_5 \\ M_6 \end{bmatrix} \quad (4\text{-}2)$$

$$\begin{bmatrix} \Delta\theta_{xM1} \\ \Delta\theta_{yM1} \end{bmatrix} = T_{M1} \begin{bmatrix} \delta_{x,M1} \\ \delta_{y,M1} \end{bmatrix} + R_{M1} \begin{bmatrix} \phi_{x,M1} \\ \phi_{y,M1} \end{bmatrix} \quad (4\text{-}3)$$

Figure 15:
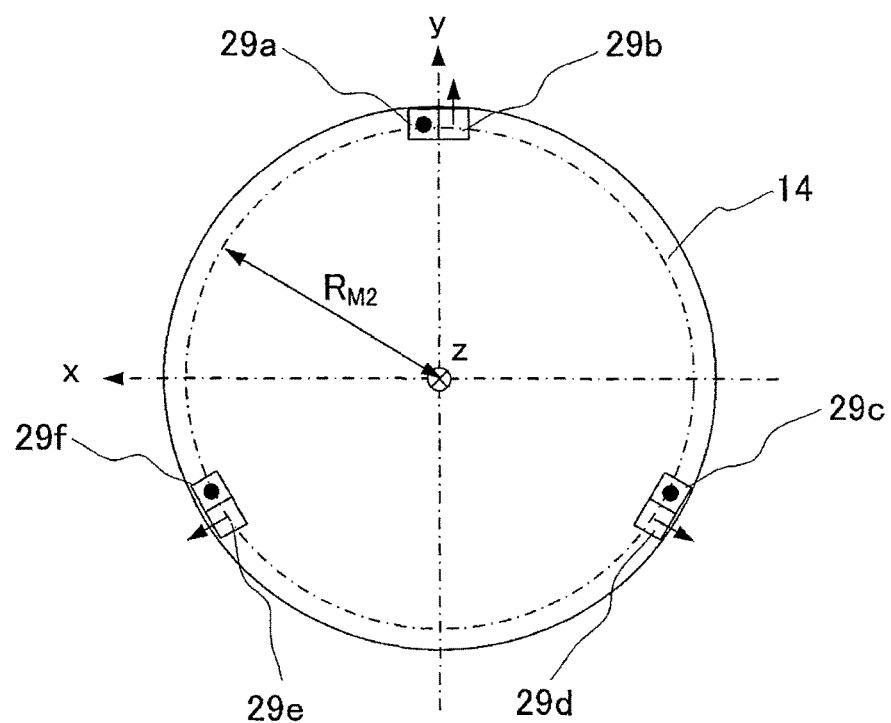
FIG. 15 is a front view illustrating sixth inertial sensors mounted on a secondary mirror of the telescope unit of the pointing axis estimation apparatus according to the fourth embodiment of the present invention.

FIG. 15, which is a front view of the secondary mirror 14 (viewed from the left side in FIG. 13), illustrates an example of an arrangement method for the sixth inertial sensors 29. On this occasion, the coordinate axes are defined as in FIGS. 2 and 3. Sixth inertial sensors 29d and 29e for detecting the translational displacement in the x axis direction of the secondary mirror are arranged so as to detect the displacements in the x axis direction, a sixth inertial sensor 29b for detecting the translational displacement in the y axis direction of the secondary mirror is arranged so as to detect the displacements in the y axis direction, and sixth inertial sensors 29a, 29c, and 29f for detecting the rotational displacements about the x axis and the y axis of the secondary mirror are arranged so as to detect the displacements in the z axis direction. It should be noted that the arrangement method for the sixth inertial sensors includes all combinations capable of detecting the translational displacement in the x axis direction, the translational displacement in the y axis direction, the rotational displacement about the x axis, and the rotational displacement about the y axis of the secondary mirror 14. Moreover, the arrangement method for the sixth inertial sensors includes such an arrangement that any one of the six inertial sensors 29c and 29f is not installed, and such an arrangement that any one of the sixth inertial sensors 29d and 29e is not installed. Moreover, the sixth inertial sensors 29a to 29f are arranged on a circle having a radius $R_{M2}$.

A description is now given of a method of detecting the translational displacement in the x axis direction, $\delta_{x,M2}$, the rotational displacement about the x axis, $\phi_{x,M2}$, the translational displacement in the y axis direction, $\delta_{y,M2}$, and the rotational displacement about the y axis, $\phi_{y,M2}$ of the secondary mirror 14 of the telescope unit by using the sixth inertial sensors illustrated in FIG. 15. When an output of the sixth inertial sensor 29a is S1, an output of the sixth inertial sensor 29c is S2, an output of the sixth inertial sensor 29f is S3, an output of the sixth inertial sensor 29b is S4, an output of the sixth inertial sensor 29d is S5, and an output of the sixth inertial sensor 29e is S6, a relationship between the translational displacements and the angular displacements of the secondary mirror 14 of the telescope unit and the outputs of the sixth inertial sensors 29a to 29f is represented by Expression (4-4). The translational displacements and the angular displacements of the secondary mirror 14 of the telescope unit are acquired from the outputs of the sixth inertial sensors 29a to 29f by transforming Expression (4-4) as represented by Expression (4-5). On this occasion, when the sixth inertial sensors output speeds or accelerations, the values acquired by using Expression (4-5) can be converted into the translational displacements and the angular displacements by means of first-order or second-order integration. Further, when a pointing error optical conversion coefficient for the translational displacements of the secondary mirror 14 of the telescope unit is $T_{M2}$, and a pointing error optical conversion coefficient for the angular displacements of the secondary mirror 14 of the telescope unit is $R_{M2}$, pointing variations caused by the translational displacements and the angular displacements of the secondary mirror 14 of the telescope unit are represented by Expression (4-6). On this occasion, $T_{M2}$ and $R_{M2}$ are calculated by means of optical sensitivity analysis. It should be noted that the calculations by using Expressions (4-4), (4-5), and (4-6) are carried out by a telescope unit secondary-mirror attitude detector 30.

$$\begin{bmatrix} S_1 \\ S_2 \\ S_3 \\ S_4 \\ S_5 \\ S_6 \end{bmatrix} = \begin{bmatrix} 0 & 0 & 1 & R_{M2} & 0 \\ 0 & 0 & 1 & -\frac{R_{M2}}{2} & -\frac{\sqrt{3}}{2}R_{M2} \\ 0 & 0 & 1 & -\frac{R_{M2}}{2} & \frac{\sqrt{3}}{2}R_{M2} \\ 0 & 1 & 0 & 0 & 0 \\ \frac{\sqrt{3}}{2} & -\frac{1}{2} & 0 & 0 & 0 \\ -\frac{\sqrt{3}}{2} & -\frac{1}{2} & 0 & 0 & 0 \end{bmatrix} \begin{bmatrix} \delta_{x,M2} \\ \delta_{y,M2} \\ \delta_{z,M2} \\ \phi_{x,M2} \\ \phi_{y,M2} \end{bmatrix} \quad (4\text{-}4)$$

$$\begin{bmatrix} \delta_{x,M2} \\ \delta_{y,M2} \\ \delta_{z,M2} \\ \phi_{x,M2} \\ \phi_{y,M2} \end{bmatrix} = \begin{bmatrix} 0 & 0 & 0 & 0 & \frac{1}{\sqrt{3}} & -\frac{1}{\sqrt{3}} \\ 0 & 0 & 0 & \frac{2}{3} & -\frac{1}{3} & -\frac{1}{3} \\ \frac{1}{3} & \frac{1}{3} & \frac{1}{3} & 0 & 0 & 0 \\ \frac{2}{3R_{M2}} & -\frac{1}{3R_{M2}} & -\frac{1}{3R_{M2}} & 0 & 0 & 0 \\ 0 & -\frac{1}{\sqrt{3}\,R_{M2}} & \frac{1}{\sqrt{3}\,R_{M2}} & 0 & 0 & 0 \end{bmatrix} \begin{bmatrix} S_1 \\ S_2 \\ S_3 \\ S_4 \\ S_5 \\ S_6 \end{bmatrix} \quad (4\text{-}5)$$

$$\begin{bmatrix} \Delta\theta_{xM2} \\ \Delta\theta_{yM2} \end{bmatrix} = T_{M2} \begin{bmatrix} \delta_{x,M2} \\ \delta_{y,M2} \end{bmatrix} + R_{M2} \begin{bmatrix} \phi_{x,M2} \\ \phi_{y,M2} \end{bmatrix} \quad (4\text{-}6)$$

This configuration includes the fifth inertial sensors 27 installed on the primary mirror 13 and the telescope unit primary-mirror attitude detector 28, and can thus calculate the optical axis variations caused by the attitude changes in the primary mirror. This configuration also includes the sixth internal sensors 29 installed on the secondary mirror 14 and the telescope unit secondary-mirror attitude detector 30, and can thus calculate the optical axis variations caused by the attitude changes in the secondary mirror. Therefore, this configuration can determine whether or not the pointing axis variations of the telescope are caused by the attitude changes in the primary mirror of the telescope unit or by the attitude changes in the secondary mirror.

Fifth Embodiment

In this embodiment, a configuration of combining an acceleration sensor and a servo acceleration sensor is used in place of the inertial sensor. Specifically, in FIG. 2, each of the first inertial sensors 2a to 2d may be configured by combining an acceleration sensor and a servo acceleration sensor. Similarly, in FIG. 3, each of the second inertial sensors 6a to 6d may be configured by combining an acceleration sensor and a servo acceleration sensor. In FIG. 8, each of the third inertial sensors 22a to 22d may be configured by combining an acceleration sensor and a servo acceleration sensor. In FIG. 11, each of the fourth inertial sensors 25a to 25d may be configured by combining an acceleration sensor and a servo acceleration sensor.

The servo acceleration sensor can measure an acceleration of a DC component at a low noise, and, through combination with an acceleration sensor excellent in a measurement accuracy of a high frequency component, can precisely measure the acceleration in a wide range from the DC component to the high frequency component. When the first inertial sensors 2a to 2d are used, optical axis variation components of the laser light source unit serving as the reference of the pointing axis can be detected from the DC component to the high frequency component by acquiring the optical axis variation components based on the measured values. Similarly, when the second inertial sensors 6a to 6d are used, optical axis variation components caused by the attitude changes in the optical axis detection unit for detecting the laser optical axis variations can be detected from the DC component to the high frequency component. When the third inertial sensors 22a to 22d are used, optical axis variation components caused by the attitude changes in the observation sensor installation part can be detected from the DC component to the high frequency component. When the fourth inertial sensors 25a to 25d are used, optical axis variation components caused by the attitude changes in the telescope installation part can be detected from the DC component to the high frequency component. As a result, the DC component to the high frequency component of the pointing axis variations caused by the factors other than the telescope pointing axis variations can be detected, and the true pointing axis variations of the telescope can be estimated in the wide band.

Sixth Embodiment

Figure 16:
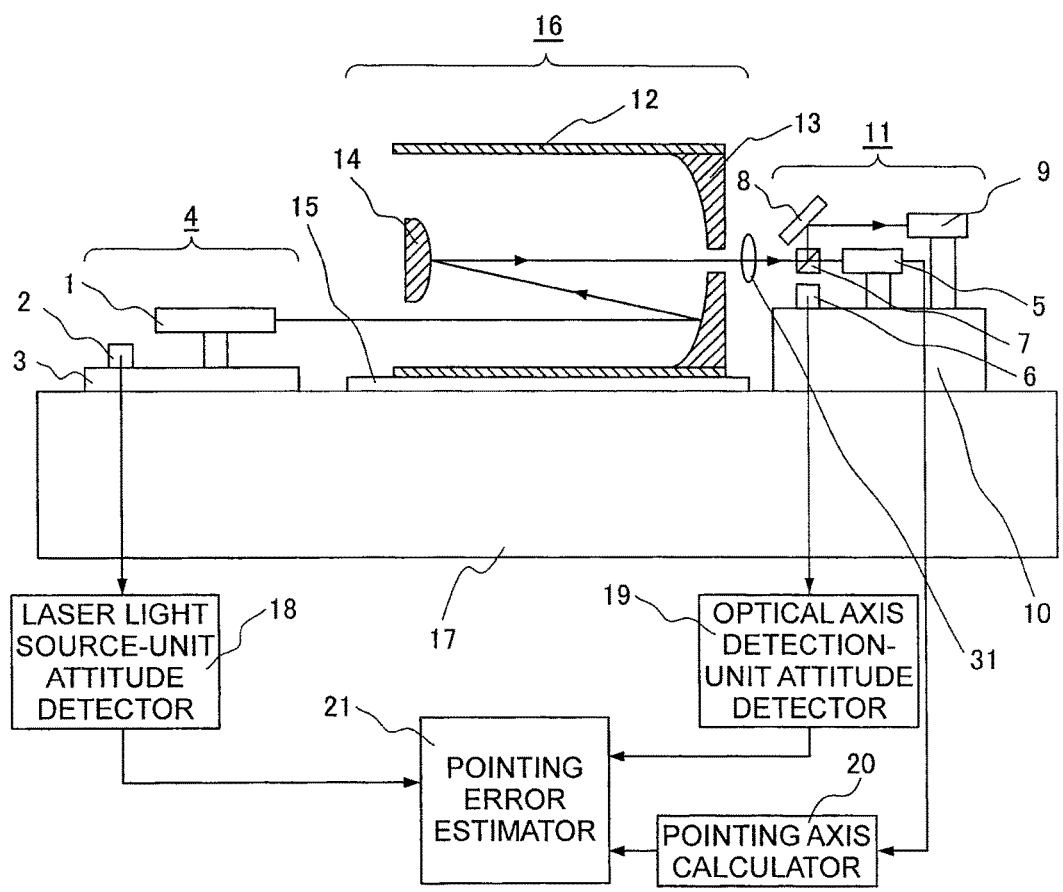
FIG. 16 is a side view illustrating a pointing axis estimation apparatus according to a sixth embodiment of the present invention.

In FIG. 1, the laser light emitted from the telescope unit 16 is not limited to parallel light, but, as illustrated in FIG. 16, a such a configuration that the laser light reflected by the primary mirror 13 and the secondary mirror 14 is controlled to transmit through a collimator lens 31, thereby converting the laser light emitted from the telescope unit 16 to parallel light may be provided. On this occasion, the optical axis variation detector 5 is an angle detector, and the laser light emitted from the laser light source 1 is parallel light.

Figure 17:
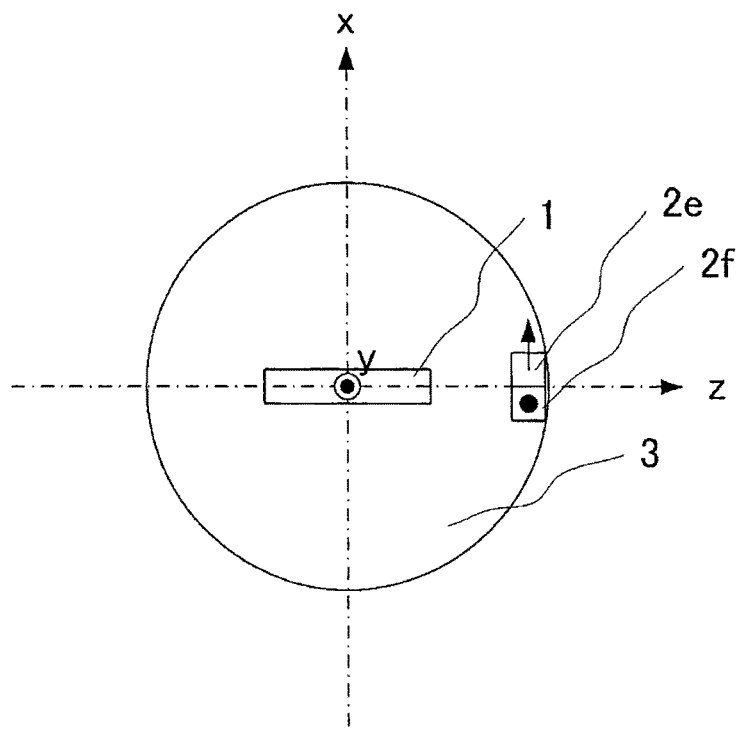
FIG. 17 is a plan view illustrating a laser light source unit of the pointing axis estimation apparatus according to the sixth embodiment of the present invention.
Figure 18:
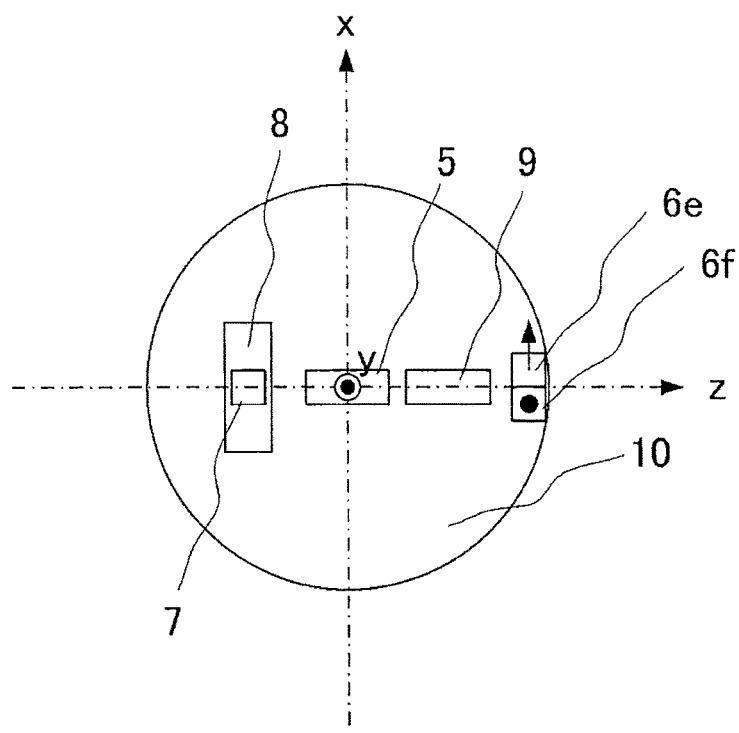
FIG. 18 is a plan view illustrating an optical axis detection unit of the pointing axis estimation apparatus according to the sixth embodiment of the present invention.

Moreover, as illustrated in FIG. 17, each of the first inertial sensors 2e and 2f installed on the laser light source installation part 3 may be configured by combining an angular velocity sensor and a gyro sensor, and, as illustrated in FIG. 18, each of the second inertial sensors 6e and 6f installed on the optical axis detection system installation part 10 may be configured by combining an angular velocity sensor and a gyro sensor. In general, the response frequency of the angular velocity sensor is in a range of from several Hz to 1,000 Hz or more, and the angular velocity sensor does not respond in a low frequency area from the DC component to several Hz. Moreover, in general, the response frequency of the gyro sensor is from the DC component to several tens or several hundreds Hz, and the gyro sensor does not respond in the high frequency area. Thus, the angular velocity can be precisely measured in the wide range from the DC component to the high frequency component by configuring each of the first inertial sensors and the second inertial sensors to have the combination of the angular velocity sensor and the gyro sensor. It should be noted that the arrangement method for the first inertial sensors 2 and the second inertial sensors 6 includes all combinations capable of detecting the rotational displacement about the y axis and the rotational displacement about the x axis of the laser light source installation part 3 and the optical axis detection unit 11.

This configuration can reduce the number of integral calculations in a process of calculating the displacement, thereby reducing an accumulated error caused by a drift component of the sensor as compared with a configuration employing the acceleration sensor. Moreover, the number of the inertial sensors can be reduced. Further, the size and the weight can be reduced, and reliability can be increased in the pointing axis estimation apparatus.

Seventh Embodiment

Figure 19:
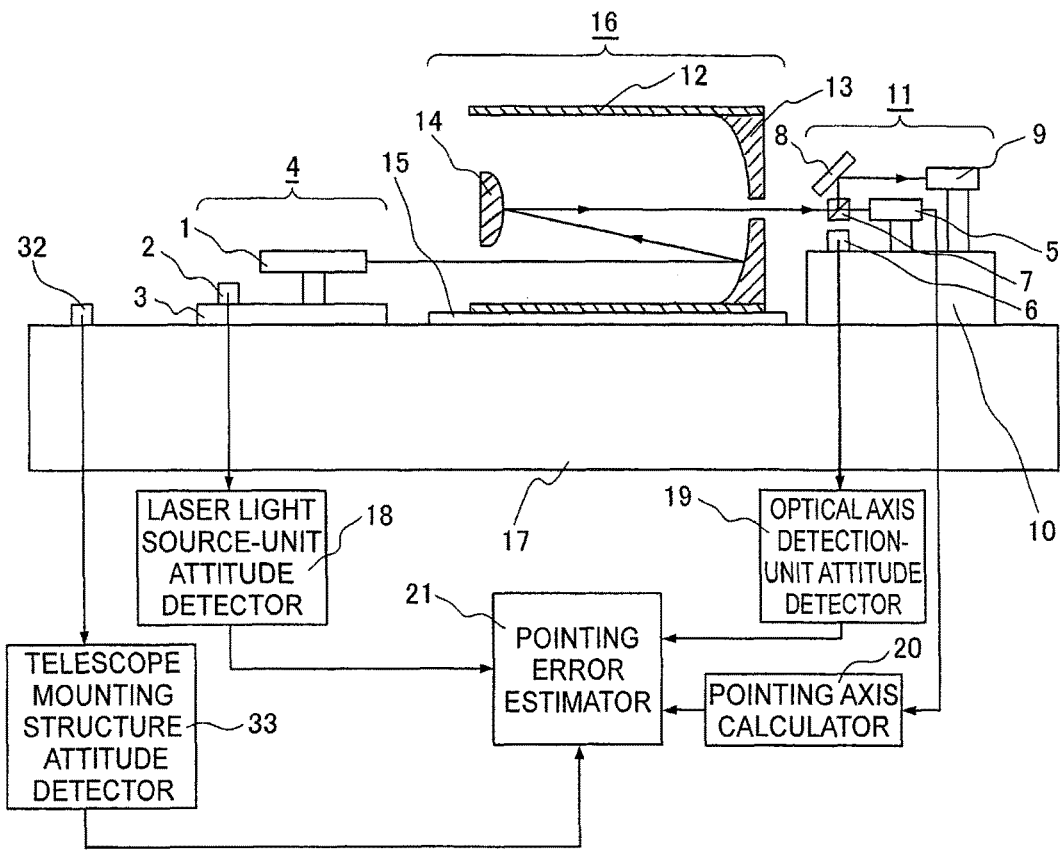
FIG. 19 is a side view illustrating a pointing axis estimation apparatus according to a seventh embodiment of the present invention.

As illustrated in FIG. 19, a configuration including seventh inertial sensors 32 and a telescope mounting structure attitude detector 33 for detecting attitude information on the telescope mounting structure 17 may be provided. It should be noted that the telescope mounting structure 17 is sufficient in the rigidity. Moreover, the seventh inertial sensor 32 includes all types of sensor capable of acquiring the attitude information on the telescope mounting structure 17 in an inertial space.

Figure 20:
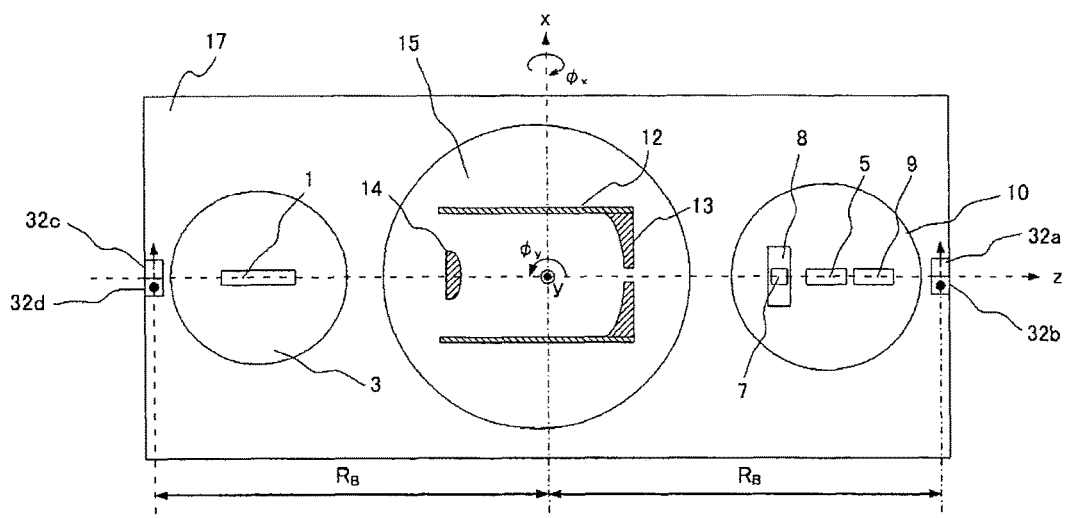
FIG. 20 is a plan view illustrating the pointing axis estimation apparatus according to the seventh embodiment of the present invention.

FIG. 20, which is a plan view of the telescope mounting structure 17, illustrates an example of an arrangement method for the seventh inertial sensors 32. A traveling direction of the laser light is defined as +z axis, a direction coming out perpendicularly from the drawing sheet is defined as +y axis, and an axis acquired by rotating the +z axis by 90 degrees in the counterclockwise direction about the y axis is defined as +x axis. Seventh inertial sensors 32a and 32c for detecting a translational displacement in the x axis direction and a rotational displacement about the y axis of the telescope mounting structure 17 are arranged so as to detect the displacements in the x axis direction, and seventh inertial sensors 32b and 32d for detecting a translational displacement in the y axis direction and a rotational displacement about the x axis of the telescope mounting structure 17 are arranged so as to detect the displacements in the y axis direction. Moreover, the seventh inertial sensors 32a to 32d are arranged at locations at a distance $R_B$ from the intersection of the x axis, the y axis, and the z axis.

A description is now given of a method of detecting the translational displacement in the x axis direction, $\delta_{x,BS}$, the rotational displacement about the x axis, $\phi_{x,BS}$, the translational displacement in the y axis direction, $\delta_{y,BS}$, and the rotational displacement about the y axis, $\phi_{y,BS}$ of the telescope mounting structure 17 by using the seventh inertial sensors illustrated in FIG. 20. When an output of the seventh inertial sensor 32c is B1, an output of the seventh inertial sensor 32d is B2, an output of the seventh inertial sensor 32a is B3, and an output of the seventh inertial sensor 32b is B4, a relationship between the translational displacements and the angular displacements of the telescope mounting structure 17 and the outputs of the seventh inertial sensors 32a to 32d is represented by Expression (7-1). The translational displacements and the angular displacements of the telescope mounting structure 17 are acquired from the outputs of the seventh inertial sensors 32a to 32d by transforming Expression (7-1) as represented by Expression (7-2). On this occasion, when the seventh inertial sensors output speeds or accelerations, the values acquired by using Expression (7-2) can be converted into the translational displacements and the angular displacements by means of first-order or second-order integration. Further, when a pointing error optical conversion coefficient for the translational displacements of the telescope mounting structure 17 is $T_{BS}$, and a pointing error optical conversion coefficient for the angular displacements of the telescope mounting structure 17 is $R_{BS}$, pointing variations caused by the translational displacements and the angular displacements of the telescope mounting structure 17 are represented by Expression (7-3). On this occasion, $T_{BS}$ and $R_{BS}$ are calculated by means of optical sensitivity analysis. It should be noted that the calculations by using Expressions (7-1), (7-2), and (7-3) are carried out by a telescope mounting structure attitude detector 33.

$$\begin{bmatrix} B_1 \\ B_2 \\ B_3 \\ B_4 \end{bmatrix} = \begin{bmatrix} 1 & 0 & 0 & -R_B \\ 0 & 1 & R_B & 0 \\ 1 & 0 & 0 & R_B \\ 0 & 1 & -R_B & 0 \end{bmatrix} \begin{bmatrix} \delta_{x,BS} \\ \delta_{y,BS} \\ \phi_{x,BS} \\ \phi_{y,BS} \end{bmatrix} \quad (7\text{-}1)$$

$$\begin{bmatrix} \delta_{x,BS} \\ \delta_{y,BS} \\ \phi_{x,BS} \\ \phi_{y,BS} \end{bmatrix} = \begin{bmatrix} \frac{1}{2} & 0 & \frac{1}{2} & 0 \\ 0 & \frac{1}{2} & 0 & \frac{1}{2} \\ 0 & \frac{1}{2R_B} & 0 & -\frac{1}{2R_B} \\ -\frac{1}{2R_B} & 0 & \frac{1}{2R_B} & 0 \end{bmatrix} \begin{bmatrix} B_1 \\ B_2 \\ B_3 \\ B_4 \end{bmatrix} \quad (7\text{-}2)$$

$$\begin{bmatrix} \Delta\theta_{xBS} \\ \Delta\theta_{yBS} \end{bmatrix} = T_{BS} \begin{bmatrix} \delta_{x,BS} \\ \delta_{y,BS} \end{bmatrix} + R_{BS} \begin{bmatrix} \phi_{x,BS} \\ \phi_{y,BS} \end{bmatrix} \quad (7\text{-}3)$$

Each of the seventh inertial sensors 32 installed on the telescope mounting structure 17 may be configured by combining an acceleration sensor and a servo acceleration sensor as described in the fifth embodiment. Alternatively, as described in the sixth embodiment, when only the attitude angle variations of the telescope mounting structure 17 need to be detected, each of the seventh inertial sensors 32 may be configured by combining an angular velocity sensor and a gyro sensor. The arrangement method for the case in which each of the seventh inertial sensors 32 is the combination of an acceleration sensor and a servo acceleration sensor includes all combinations capable of detecting the translational displacement in the x axis direction, the rotational displacement about the y axis, the translational displacement in the y axis direction, and the rotational displacement about the x axis of the telescope mounting structure 17. The arrangement method for the case in which the seventh inertial sensor 32 is the combination of an angular velocity sensor and a gyro sensor includes all combinations capable of detecting the rotational displacement about the y axis and the rotational displacement about the x axis of the telescope mounting structure 17.

In the pointing axis variation estimator 21, the telescope mounting structure attitude changes calculated by the telescope mounting structure attitude detector 33 are removed from the laser light source unit pointing variations calculated by the laser light source-unit attitude detector 18 by using the relational expression represented by Expression (7-4), thereby calculating laser light source unit relative pointing variations. Simultaneously, the telescope mounting structure attitude changes calculated by the telescope mounting structure attitude detector 33 are removed from the optical axis detection unit pointing variations calculated by the optical axis detection-unit attitude detector 19, thereby calculating optical axis detection unit relative pointing variations.

Next, in the pointing axis variation estimator 21, laser light source unit relative pointing variations and the optical axis detection unit relative pointing variations are removed from the pointing axis calculated by the pointing axis calculator 20 by using the relational expression represented by Expression (7-5), thereby estimating the true pointing axis variations of the telescope.

$$\begin{bmatrix} \Delta\bar{\theta}_{xPS} \\ \Delta\bar{\theta}_{yPS} \end{bmatrix} = \begin{bmatrix} \Delta\theta_{xPS} \\ \Delta\theta_{yPS} \end{bmatrix} - \begin{bmatrix} \Delta\theta_{xBS} \\ \Delta\theta_{yBS} \end{bmatrix}, \begin{bmatrix} \Delta\bar{\theta}_{xLS} \\ \Delta\bar{\theta}_{yLS} \end{bmatrix} = \begin{bmatrix} \Delta\theta_{xLS} \\ \Delta\theta_{yLS} \end{bmatrix} - \begin{bmatrix} \Delta\theta_{xBS} \\ \Delta\theta_{yBS} \end{bmatrix} \quad (7\text{-}4)$$

$$\begin{bmatrix} \Delta\theta_x \\ \Delta\theta_y \end{bmatrix} = \begin{bmatrix} \Delta\theta_{xS} \\ \Delta\theta_{yS} \end{bmatrix} - \begin{bmatrix} \Delta\bar{\theta}_{xLS} \\ \Delta\bar{\theta}_{yLS} \end{bmatrix} - \begin{bmatrix} \Delta\bar{\theta}_{xPS} \\ \Delta\bar{\theta}_{yPS} \end{bmatrix} \quad (7\text{-}5)$$

Figure 21:
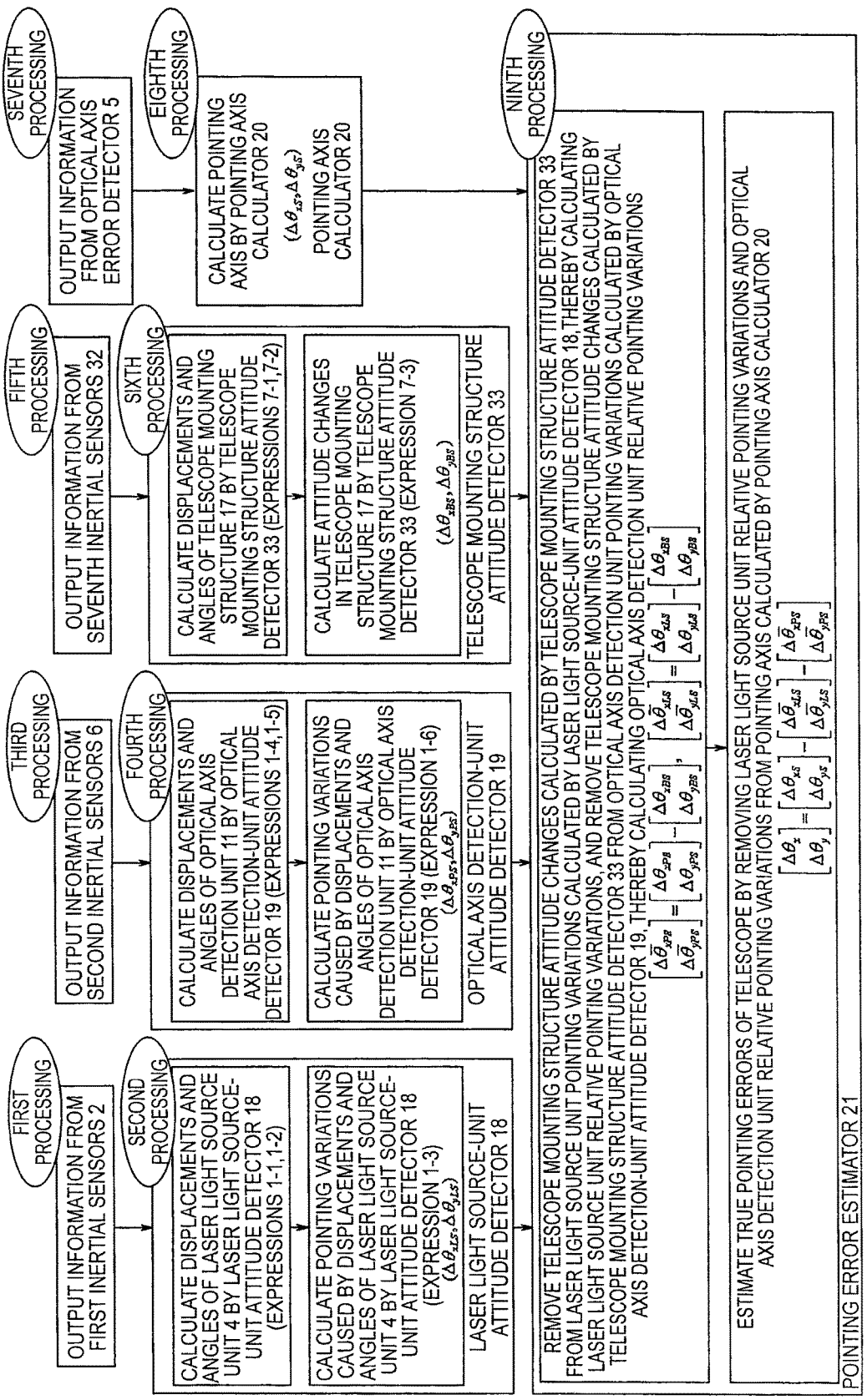
FIG. 21 is a flowchart of the pointing axis estimation according to the seventh embodiment of the present invention.

A flowchart of the pointing axis variation estimation is illustrated in FIG. 21, and a method for the pointing axis variation estimation is summarized below.

In first processing, the laser light source-unit attitude detector 18 acquires the information output from the first inertial sensors 2.

In second processing, the laser light source-unit attitude detector 18 calculates the displacements and the angles of the laser light source unit 4 by using the relational expressions represented by Expressions (1-1) and (1-2), calculates the pointing variations of the laser light source unit 4 by using the relational expression represented by Expression (1-3), and outputs the pointing variations to the pointing axis variation estimator 21.

In third processing, the optical axis detection-unit attitude detector 19 acquires the information output from the second inertial sensors 6.

In fourth processing, the optical axis detection-unit attitude detector 19 calculates the displacements and the angles of the optical axis detection unit 11 by using the relational expressions represented by Expressions (1-4) and (1-5), calculates the pointing variations of the optical axis detection unit 11 by using the relational expression represented by Expression (1-6), and outputs the pointing variations to the pointing axis variation estimator 21.

In fifth processing, the telescope mounting structure attitude detector 33 acquires information output from the seventh inertial sensors 32.

In sixth processing, the telescope mounting structure attitude detector 33 calculates the displacements and the angles of the telescope mounting structure 17 by using the relational expressions represented by Expressions (7-1) and (7-2), calculates the attitude changes of the telescope mounting structure 17 by using the relational expression represented by Expression (7-3), and outputs the attitude changes to the pointing axis variation estimator 21.

In seventh processing, the pointing axis calculator 20 acquires information output from the optical axis variation detector 5.

In eighth processing, the pointing axis calculator 20 calculates the pointing variations of the telescope, and inputs the pointing variations to the pointing axis variation estimator 21.

In ninth processing, in the pointing axis variation estimator 21, by using the relational expression represented by Expression (7-4), the telescope mounting structure attitude changes calculated by the telescope mounting structure attitude detector 33 are removed from the laser light source unit pointing variations calculated by the laser light source-unit attitude detector 18, thereby calculating the laser light source unit relative pointing variations. Simultaneously, the telescope mounting structure attitude changes calculated by the telescope mounting structure attitude detector 33 are removed from the optical axis detection unit pointing variations calculated by the optical axis detection-unit attitude detector 19, thereby calculating the optical axis detection unit relative pointing variations.

Next, in the pointing axis variation estimator 21, the laser light source unit relative pointing variations and the optical axis detection unit relative pointing variations are removed from the pointing axis calculated by the pointing axis calculator 20 by using the relational expression represented by Expression (7-5), thereby estimating the true pointing axis variations of the telescope.

It should be noted that the first and second processing, the third and fourth processing, the fifth and sixth processing, and the seventh and eighth processing may be carried out simultaneously in parallel.

As described above, the pointing axis estimation apparatus according to the seventh embodiment includes the seventh inertial sensors 32 installed on the telescope mounting structure 17 and the telescope mounting structure attitude detector 33, and can thus calculate the optical axis variations caused by the attitude changes in the telescope mounting structure. In the pointing axis variation estimator 21, the telescope mounting structure attitude changes calculated by the telescope mounting structure attitude detector 33 are removed from the laser light source unit pointing variations calculated by the laser light source-unit attitude detector 18, thereby calculating the laser light source unit relative pointing variations. As a result, the attitude changes in the telescope mounting structure can be separated from the pointing variations of the laser light source unit. Moreover, the pointing axis estimation apparatus according to the seventh embodiment includes the seventh inertial sensors installed on the telescope mounting structure 17 and the telescope mounting structure attitude detector 33, and can thus calculate the optical axis variations caused by the attitude changes in the telescope mounting structure. In the pointing axis variation estimator 21, the telescope mounting structure attitude changes calculated by the telescope mounting structure attitude detector 33 are removed from the optical axis detection unit pointing variations calculated by the optical axis detection-unit attitude detector 19, thereby calculating the optical axis detection unit relative pointing variations. As a result, the attitude changes in the telescope mounting structure can be separated from the pointing variations of the optical axis detection unit. Similarly, the pointing axis estimation apparatus according to the seventh embodiment includes the seventh inertial sensors 32 installed on the telescope mounting structure 17 and the telescope mounting structure attitude detector 33, and can thus calculate the optical axis variations caused by the attitude changes in the telescope mounting structure. In the pointing axis variation estimator 21, the telescope mounting structure attitude changes calculated by the telescope mounting structure attitude detector 33 are removed from the observation sensor installation part pointing variations calculated by the observation sensor installation-part attitude detector 24, thereby calculating the observation sensor installation part relative pointing variations. As a result, the attitude changes in the telescope mounting structure can be separated from the pointing variations of the observation sensor installation part. Similarly, the pointing axis estimation apparatus according to the seventh embodiment includes the seventh inertial sensors 32 installed on the telescope mounting structure 17 and the telescope mounting structure attitude detector 33, and can thus calculate the optical axis variations caused by the attitude changes in the telescope mounting structure. In the pointing axis variation estimator 21, the telescope mounting structure attitude changes calculated by the telescope mounting structure attitude detector 33 are removed from the telescope installation part pointing variations calculated by the telescope installation-part attitude detector 26, thereby calculating the telescope installation part relative pointing variations. As a result, the attitude changes in the telescope mounting structure can be separated from the pointing variations of the pointing axis variations of the telescope installation part. Thus, the pointing axis variations of the telescope and the attitude changes in the telescope mounting structure can be separated from each other.

Eighth Embodiment

Figure 22:
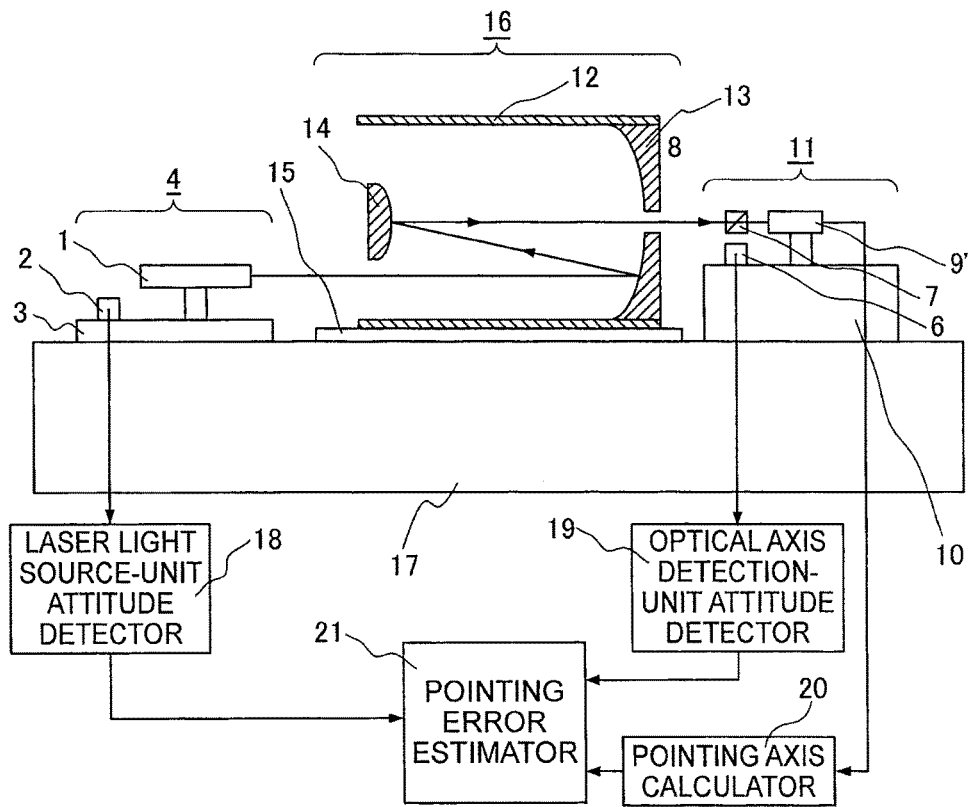
FIG. 22 is a side view illustrating a pointing axis estimation apparatus according to an eighth embodiment of the present invention.

As illustrated in FIG. 22, a wide band observation sensor 9' may be used as the observation sensor 9, thereby providing such a configuration that the observation sensor is also used as the optical axis variation detector.

When the true pointing axis variations of the telescope are estimated in a wide band, the optical axis variation detector 5 needs to have a read speed equivalent to or more than the band to be estimated. In general, the observation sensor 9 is slow in the read speed, but when the observation sensor (hereinafter referred to as wide band observation sensor 9') can be realized by using a CMOS sensor capable of high speed reading (read speed equivalent to or more than the band to be estimated), for example, the observation sensor can also be used as the optical axis variation detector.

This configuration can eliminate the optical axis variation detector. Thus, this configuration can reduce the size and the weight of the pointing axis estimation apparatus, and can increase the reliability.

Ninth Embodiment

Figure 23:
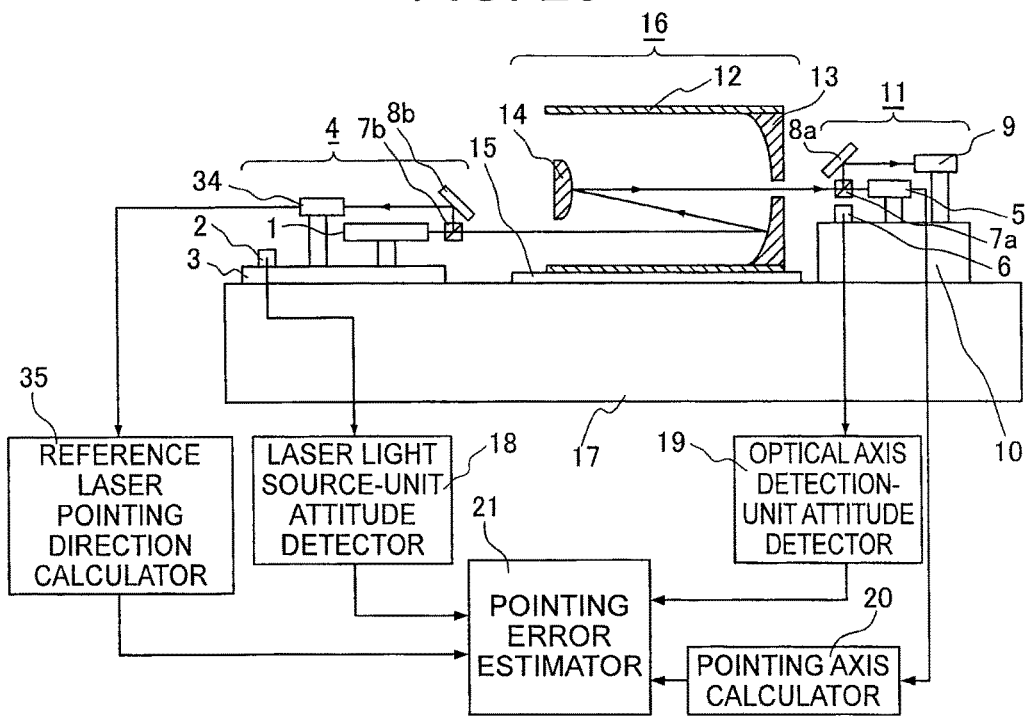
FIG. 23 is a side view illustrating a pointing axis estimation apparatus according to a ninth embodiment of the present invention.

As illustrated in FIG. 23, a configuration including a beam splitter 7b, a reflecting mirror 8b, a laser reference light axis variation detector 34, and a laser reference light pointing direction calculator 35 may be provided. Part of the laser light serving as the reference of the pointing axis is split by the beam splitter 7b, is returned by the reflecting mirror 8b, and is caused to enter the laser reference light axis variation detector 34. The laser reference light pointing direction calculator 35 calculates pointing axis variations of the laser light itself, which are caused by the inside of the laser light source, by using information from the laser reference light axis variation detector 34.

In the pointing axis variation estimator 21, the pointing variations of the laser light source unit calculated by the laser light source-unit attitude detector 18, the pointing variations of the optical axis detection unit calculated by the optical axis detection-unit attitude detector 19, and the laser reference light axis pointing variations calculated by the laser reference light pointing direction calculator 35 are removed from the pointing axis variations calculated by the pointing axis calculator 20 by using the relational expression represented by Expression (9-1), thereby estimating the true pointing axis variations of the telescope.

$$\begin{bmatrix} \Delta\theta_x \\ \Delta\theta_y \end{bmatrix} = \begin{bmatrix} \Delta\theta_{xS} \\ \Delta\theta_{yS} \end{bmatrix} - \begin{bmatrix} \Delta\theta_{xLS} \\ \Delta\theta_{yLS} \end{bmatrix} - \begin{bmatrix} \Delta\theta_{xPS} \\ \Delta\theta_{yPS} \end{bmatrix} - \begin{bmatrix} \Delta\theta_{xLP} \\ \Delta\theta_{yLP} \end{bmatrix} \quad (9\text{-}1)$$

Figure 24:
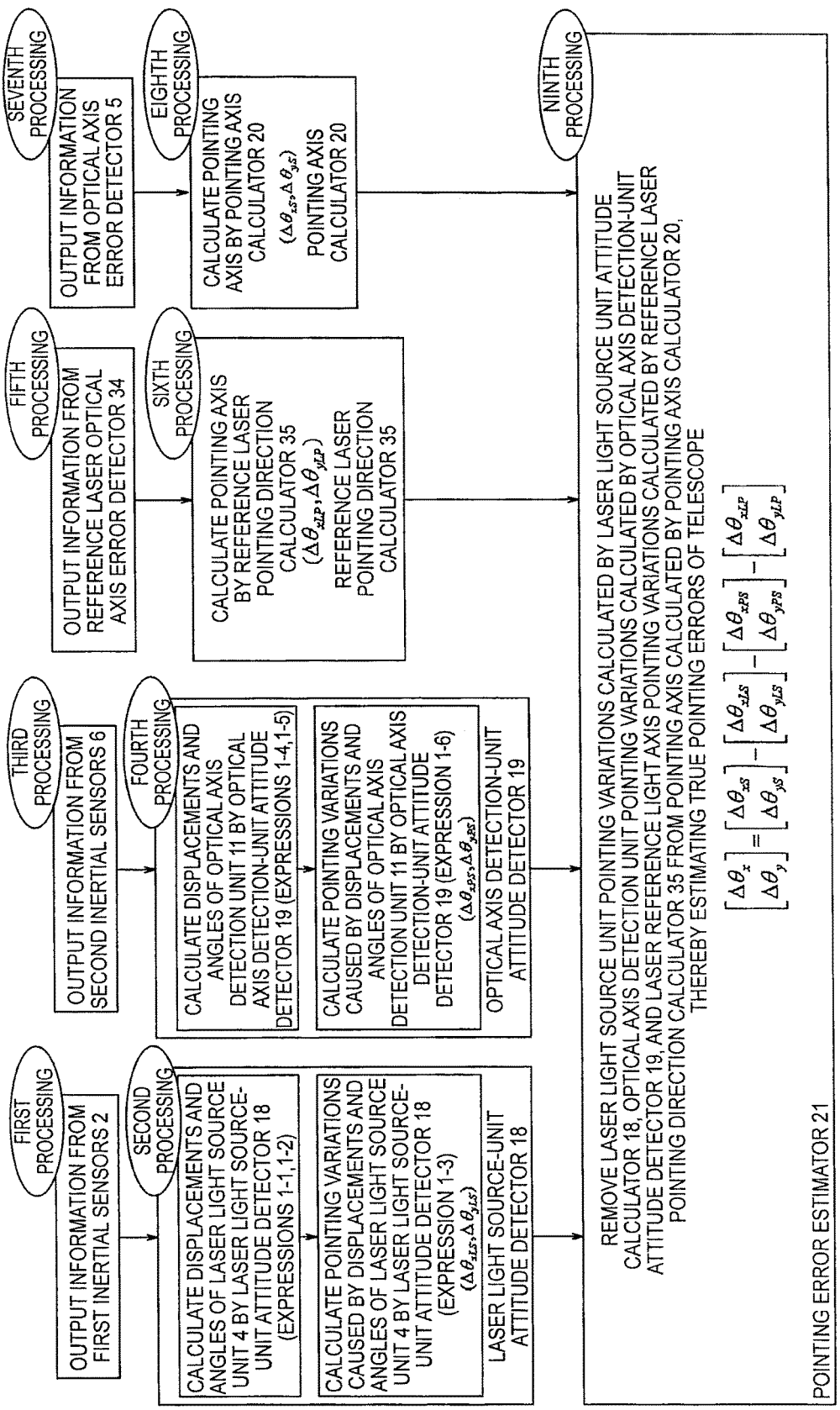
FIG. 24 is a flowchart of the pointing axis estimation according to the ninth embodiment of the present invention.

A flowchart of the pointing axis variation estimation is illustrated in FIG. 24, and a method for the pointing axis variation estimation is summarized below.

In first processing, the laser light source-unit attitude detector 18 acquires the information output from the first inertial sensors 2.

In second processing, the laser light source-unit attitude detector 18 calculates the displacements and the angles of the laser light source unit 4 by using the relational expressions represented by Expressions (1-1) and (1-2), calculates the pointing variations of the laser light source unit 4 by using the relational expression represented by Expression (1-3), and outputs the pointing variations to the pointing axis variation estimator 21.

In third processing, the optical axis detection-unit attitude detector 19 acquires the information output from the second inertial sensors 6.

In fourth processing, the optical axis detection-unit attitude detector 19 calculates the displacements and the angles of the optical axis detection unit 11 by using the relational expressions represented by Expressions (1-4) and (1-5), calculates the pointing variations of the optical axis detection unit 11 by using the relational expression represented by Expression (1-6), and outputs the pointing variations to the pointing axis variation estimator 21.

In fifth processing, the laser reference light pointing direction calculator 35 acquires information output from the laser reference light axis variation detector 34.

In sixth processing, the laser reference light pointing direction calculator 35 calculates the pointing axis variations of the laser light itself, and outputs the pointing axis variations to the pointing axis variation estimator 21.

In seventh processing, the pointing axis calculator 20 acquires information output from the optical axis variation detector 5.

In eighth processing, the pointing axis calculator 20 calculates the pointing variations of the telescope, and inputs the pointing variations to the pointing axis variation estimator 21.

In ninth processing, in the pointing axis variation estimator 21, the pointing variations of the laser light source unit calculated by the laser light source-unit attitude detector 18, and the pointing variations of the optical axis detection unit calculated by the optical axis detection-unit attitude detector 19, and the laser reference light axis pointing variations calculated by the laser reference light pointing direction calculator 35 are removed from the pointing axis variations calculated by the pointing axis calculator 20 by using the relational expression represented by Expression (9-1), thereby estimating the true pointing axis variations of the telescope.

It should be noted that the first and second processing, the third and fourth processing, the fifth and sixth processing, and the seventh and eighth processing may be carried out simultaneously in parallel.

As a result, in the pointing axis estimation apparatus according to the ninth embodiment, the optical axis variations caused by the inside of the laser light source can be calculated, and the true pointing axis variations of the telescope can thus be highly precisely estimated.

Tenth Embodiment

The pointing axis variation estimators 21 according to the first to ninth embodiments may be configured to carry out the processing in a form of offline.

This configuration enables to realize the pointing axis variation estimator by using an independent computer, and thus to reduce a load applied by computer calculation processing in the pointing axis estimation apparatus, resulting in a reduction in power consumption of the pointing axis estimation apparatus.

REFERENCE SIGNS LIST 1 laser light source, 2 first inertial sensor, 3 laser light source installation part, 4 laser light source unit, 5 optical axis variation detector, 6 second inertial sensor, 7 beam splitter, 8 reflecting mirror, 9 observation sensor, 9' wide band observation sensor, 10 optical axis detection system installation part, 11 optical axis detection unit, 12 body tube, 13 primary mirror, 14 secondary mirror, 15 telescope installation part, 16 telescope unit, telescope mounting structure, 18 laser light source-unit attitude detector, 19 optical axis detection-unit attitude detector, 20 pointing axis calculator, 21 pointing axis variation estimator, 22 third inertial sensor, 23 observation sensor installation part, 24 observation sensor installation-part attitude detector, 25 fourth inertial sensor, 26 telescope installation-part attitude detector, 27 fifth inertial sensor, 28 telescope unit primary-mirror attitude detector, 29 sixth inertial sensor, 30 telescope unit secondary-mirror attitude detector, 31 collimator lens, 32 seventh inertial sensor, 33 telescope mounting structure attitude detector, 34 laser reference light axis variation detector, 35 laser reference light pointing direction calculator, 36 laser reference light, 37 observed light

The invention claimed is:

1. A pointing axis estimation apparatus, comprising:
a laser light source unit comprising a laser light source;
a telescope unit to which a laser light emitted from the laser light source is entered;
a first inertial sensor installed on the laser light source unit;
a processor programmed to perform as a laser light source-unit attitude detector that calculates translational and rotational displacements of the laser light source unit based on information from the first inertial sensor;
an optical axis detection unit including a second inertial sensor and an optical axis error detector for detecting a laser optical axis variation of the laser light emitted from the telescope unit;
the processor further programmed to perform as an optical axis detection-unit attitude detector that calculates translational and rotational displacements of the optical axis detection unit based on information from the second inertial sensor;
the processor further programmed to perform as a pointing axis calculator that calculates a pointing axis variation of the telescope unit based on information from the optical axis error detector; and
the processor further programmed to perform as a pointing error estimator that calculates a true pointing error of the telescope unit based on displacement data output from the laser light source-unit attitude detector, the optical axis detection-unit attitude detector, and the pointing axis calculator.

2. A pointing axis estimation apparatus according to claim 1, further comprising:
an observation sensor to which observed light emitted from the telescope unit is guided;
a third inertial sensor installed together with the observation sensor on an observation sensor installation part physically separated from the optical axis detection unit; and
the processor further programmed to perform as an observation sensor installation-part attitude detector that calculates translational and rotational displacements of the observation sensor installation part based on information from the third inertial sensor.

3. A pointing axis estimation apparatus according to claim 2, further comprising:
a fourth inertial sensor installed on a telescope installation part; and
the processor further programmed to perform as a telescope installation-part attitude detector that calculates translational and rotational displacements of the telescope installation part based on information from the fourth inertial sensor.

4. A pointing axis estimation apparatus according to claim 2, wherein the inertial sensor comprises a combination of an acceleration sensor and a servo accelerometer.

5. A pointing axis estimation apparatus according to claim 2, further comprising an optical system for converting laser light emitted from the telescope unit into parallel light, wherein the inertial sensor comprises a combination of an angular rate sensor and a gyroscope.

6. A pointing axis estimation apparatus according to claim 2, wherein:
the pointing error estimator inputs attitude angle information from the inertial sensor and a telescope mounting structure.

7. A pointing axis estimation apparatus according to claim 2, wherein the observation sensor is also used as the optical axis error detector.

8. A pointing axis estimation apparatus according to claim 2, wherein
the laser light source unit comprises:
a beam splitter for splitting part of laser light serving as a reference of the pointing axis; and
a reference laser optical axis error detector for detecting the split laser light;
the pointing axis estimation apparatus further comprises a reference laser pointing direction calculator for calculating a pointing variation of the laser light itself caused by an inside of a laser light source based on information from the reference laser optical axis error detector; and
the pointing error estimator removes the pointing variation of the laser light itself, which is output from the reference laser pointing direction calculator, to thereby calculate the true pointing error of the telescope unit.

9. A pointing axis estimation apparatus according to claim 1, further comprising:
a fourth inertial sensor installed on a telescope installation part; and
the processor further programmed to perform as a telescope installation-part attitude detector that calculates translational and rotational displacements of the telescope installation part based on information from the fourth inertial sensor.

10. A pointing axis estimation apparatus according to claim 1, wherein the inertial sensor comprises a combination of an acceleration sensor and a servo accelerometer.

11. A pointing axis estimation apparatus according to claim 1, further comprising an optical system for converting laser light emitted from the telescope unit into parallel light, wherein the inertial sensor comprises a combination of an angular rate sensor and a gyroscope.

12. A pointing axis estimation apparatus according to claim 1, wherein:
the pointing error estimator inputs attitude angle information from the inertial sensor and a telescope mounting structure.

13. A pointing axis estimation apparatus according to claim 1, wherein the observation sensor is also used as the optical axis error detector.

14. A pointing axis estimation apparatus according to claim 1, wherein:
the laser light source unit comprises:
a beam splitter for splitting part of laser light serving as a reference of the pointing axis; and
a reference laser optical axis error detector for detecting the split laser light;
the pointing axis estimation apparatus further comprises a reference laser pointing direction calculator for calculating a pointing variation of the laser light itself caused by an inside of a laser light source based on information from the reference laser optical axis error detector; and
the pointing error estimator removes the pointing variation of the laser light itself, which is output from the reference laser pointing direction calculator, to thereby calculate the true pointing error of the telescope unit.

15. A pointing axis estimation apparatus according to claim 1,
wherein the processor as a pointing error estimator that calculates the pointing error of the telescope unit by removing the pointing variations calculated by the laser light source-unit attitude detector and the pointing variations calculated by the optical axis detection-unit attitude detector from the pointing axis variations calculated by the pointing axis calculator.

16. A pointing axis estimation apparatus, comprising:
a telescope unit;
an observation sensor;
a first inertial sensor installed on a laser light source unit;
a processor programmed to perform as a laser light source-unit attitude detector that calculates translational and rotational displacements of the laser light source unit based on information from the first inertial sensor;
a second inertial sensor installed on an optical axis detection unit;
the processor further programmed to perform as an optical axis detection-unit attitude detector that calculates translational and rotational displacements of the optical axis detection unit based on information from the second inertial sensor;
an optical axis error detector for detecting a laser optical axis variation;
the processor further programmed to perform as a pointing axis calculator that calculates a pointing axis variation of the telescope unit based on information from the optical axis error detector;
the processor further programmed to perform as a pointing error estimator that calculates a true pointing error of the telescope unit based on displacement data output from the laser light source-unit attitude detector, the optical axis detection-unit attitude detector, and the pointing axis calculator;
a fifth inertial sensor installed on a primary mirror of the telescope unit;
the processor further programmed to perform as a telescope unit primary-mirror attitude detector that calculates translational and rotational displacements of the primary mirror of the telescope unit based on information from the fifth inertial sensor;
a sixth inertial sensor installed on a secondary mirror of the telescope unit; and
the processor further programmed to perform as a telescope unit secondary-minor attitude detector that calculates translational and rotational displacements of the secondary mirror based on information from the sixth inertial sensor.

17. A pointing axis estimation apparatus according to claim 16, further comprising:
a fifth inertial sensor installed on a primary mirror of the telescope unit;
the processor further programmed to perform as a telescope unit primary-mirror attitude detector that calculates translational and rotational displacements of the primary mirror of the telescope unit based on information from the fifth inertial sensor;
a sixth inertial sensor installed on a secondary mirror of the telescope unit; and
the processor further programmed to perform as a telescope unit secondary-minor attitude detector that calculates translational and rotational displacements of the secondary mirror based on information from the sixth inertial sensor.

* * * * *